United States Patent
Spivack et al.

(10) Patent No.: US 9,189,479 B2
(45) Date of Patent: *Nov. 17, 2015

(54) SEMANTIC WEB PORTAL AND PLATFORM

(75) Inventors: Nova T. Spivack, Sherman Oaks, CA (US); Kristinn R. Thorisson, Tarrytown, NY (US); James M. Wissner, San Francisco, CA (US)

(73) Assignee: VCVC III LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,714

(22) Filed: Sep. 12, 2012

(65) Prior Publication Data

US 2013/0091090 A1    Apr. 11, 2013

Related U.S. Application Data

(63) Continuation of application No. 12/197,207, filed on Aug. 22, 2008, now Pat. No. 8,275,796, which is a continuation of application No. 11/062,125, filed on Feb. 19, 2005, now Pat. No. 7,433,876.

(60) Provisional application No. 60/546,794, filed on Feb. 23, 2004.

(51) Int. Cl.
*G06F 17/30* (2006.01)

(52) U.S. Cl.
CPC ...... *G06F 17/30011* (2013.01); *G06F 17/3089* (2013.01)

(58) Field of Classification Search
CPC ............... G06F 17/30011; G06F 17/30867; G06F 17/3089; G06F 17/30864; G06F 17/30; G06F 17/3061; G06F 17/30731; G06Q 10/10; G06Q 10/06; G06Q 30/02
USPC ......... 707/603, 608, 707, 736, 783, 784, 785, 707/794, E17.111, 999.009; 709/204, 21, 709/219, 224, 225
See application file for complete search history.

(56) References Cited

U.S. PATENT DOCUMENTS 5,406,477 A * 4/1995 Harhen .............................. 703/6
5,408,567 A   4/1995 Hamilton (Continued)

FOREIGN PATENT DOCUMENTS

EP    1310884 A2    5/2003
JP    2007094592 A    4/2007

(Continued)

OTHER PUBLICATIONS

Alexander Maedche—"Layered Ontology Engineering"—Ontology Learning for the Semantic Web—The Kluwer International Series in Engineering and Computer Science vol. 665, 2002, pp. 29-55.*

(Continued)

*Primary Examiner* — Anh Ly
(74) *Attorney, Agent, or Firm* — Perkins Coie LLP

(57) ABSTRACT

An application that enables users to effectively utilize and manage knowledge and data the user posses and allows other users to effectively and seamlessly benefit from the user's knowledge and data over a computer network is also disclosed. A method of processing content created by a user utilizing a semantic, ontology-driven portal on a computer network is described. The semantic portal application provides the user with a content base, such as a semantic form or meta-form, for creating a semantic posting. The semantic portal utilizes a knowledge data structure, such as a taxonomy or ontology, in preparing a semantic posting based on the information provided by the user via the content base. The semantic portal application prepares a preview of a semantic posting for evaluation by the user. The semantic posting is then either modified by the user or accepted and posted by the user for external parties to view.

17 Claims, 2 Drawing Sheets

(56) References Cited

U.S. PATENT DOCUMENTS

| | | | |
|---|---|---|---|
| 5,408,657 A | 4/1995 | Bigelow et al. | |
| 5,515,532 A | 5/1996 | Iijima | |
| 5,548,749 A | 8/1996 | Kroenke et al. | |
| 5,717,924 A | 2/1998 | Kawai | |
| 5,809,297 A | 9/1998 | Kroenke et al. | |
| 5,819,086 A | 10/1998 | Kroenke | |
| 5,873,077 A | 2/1999 | Kanoh et al. | |
| 5,905,498 A | 5/1999 | Diament | |
| 5,925,100 A | 7/1999 | Drewry et al. | |
| 5,966,686 A | 10/1999 | Heidorn et al. | |
| 6,173,287 B1 | 1/2001 | Eberman et al. | |
| 6,199,099 B1 * | 3/2001 | Gershman et al. | 709/203 |
| 6,311,194 B1 | 10/2001 | Sheth et al. | |
| 6,363,377 B1 | 3/2002 | Kravets et al. | |
| 6,370,542 B1 * | 4/2002 | Kenyon | 707/603 |
| 6,401,085 B1 * | 6/2002 | Gershman et al. | 707/E17.109 |
| 6,411,952 B1 | 6/2002 | Bharat et al. | |
| 6,499,021 B1 | 12/2002 | Abu-Hakima et al. | |
| 6,513,059 B1 | 1/2003 | Gupta et al. | |
| 6,516,315 B1 | 2/2003 | Gupta | |
| 6,530,083 B1 | 3/2003 | Liebenow | |
| 6,633,869 B1 | 10/2003 | Duparcmeur et al. | |
| 6,643,650 B1 | 11/2003 | Slaughter et al. | |
| 6,654,741 B1 | 11/2003 | Cohen et al. | |
| 6,704,729 B1 | 3/2004 | Klein et al. | |
| 6,711,585 B1 | 3/2004 | Copperman et al. | |
| 6,741,744 B1 | 5/2004 | Hsu | |
| 6,748,441 B1 | 6/2004 | Gemmell | |
| 6,785,688 B2 | 8/2004 | Abajian et al. | |
| 6,789,077 B1 | 9/2004 | Slaughter et al. | |
| 6,816,850 B2 | 11/2004 | Culliss | |
| 6,816,857 B1 | 11/2004 | Weissman et al. | |
| 6,839,701 B1 | 1/2005 | Baer et al. | |
| 6,847,974 B2 | 1/2005 | Wachtel | |
| 6,859,807 B1 | 2/2005 | Knight et al. | |
| 6,868,447 B1 | 3/2005 | Slaughter et al. | |
| 6,892,196 B1 * | 5/2005 | Hughes | 707/754 |
| 6,941,300 B2 | 9/2005 | Jensen-Grey | |
| 6,996,566 B1 | 2/2006 | George et al. | |
| 7,072,883 B2 | 7/2006 | Potok et al. | |
| 7,092,928 B1 | 8/2006 | Elad et al. | |
| 7,093,200 B2 | 8/2006 | Schreiber et al. | |
| 7,177,798 B2 | 2/2007 | Hsu et al. | |
| 7,185,075 B1 | 2/2007 | Mishra et al. | |
| 7,197,451 B1 | 3/2007 | Carter et al. | |
| 7,200,862 B2 | 4/2007 | Murching et al. | |
| 7,216,002 B1 | 5/2007 | Anderson | |
| 7,246,164 B2 * | 7/2007 | Lehmann et al. | 709/225 |
| 7,260,573 B1 | 8/2007 | Jeh et al. | |
| 7,284,196 B2 | 10/2007 | Skeen et al. | |
| 7,343,365 B2 | 3/2008 | Farnham et al. | |
| 7,398,261 B2 | 7/2008 | Spivack et al. | |
| 7,401,087 B2 * | 7/2008 | Copperman et al. | 707/737 |
| 7,433,876 B2 | 10/2008 | Spivack et al. | |
| 7,516,401 B2 | 4/2009 | Chen et al. | |
| 7,536,323 B2 | 5/2009 | Hsieh | |
| 7,584,194 B2 | 9/2009 | Tuttle et al. | |
| 7,584,208 B2 | 9/2009 | Spivack et al. | |
| 7,640,267 B2 | 12/2009 | Spivack et al. | |
| 7,707,161 B2 | 4/2010 | Hall et al. | |
| 7,730,063 B2 * | 6/2010 | Eder | 707/736 |
| 7,730,094 B2 | 6/2010 | Kaler et al. | |
| 7,739,121 B2 | 6/2010 | Jain et al. | |
| 7,769,742 B1 | 8/2010 | Brawer et al. | |
| 7,769,757 B2 * | 8/2010 | Grefenstette et al. | 707/736 |
| 7,774,380 B2 | 8/2010 | Burke et al. | |
| 7,774,388 B1 * | 8/2010 | Runchey | 707/811 |
| 7,788,293 B2 | 8/2010 | Paszior et al. | |
| 7,793,209 B2 | 9/2010 | Kikuchi | |
| 7,814,111 B2 | 10/2010 | Levin | |
| 7,895,235 B2 | 2/2011 | Baeza-Yates et al. | |
| 7,904,439 B2 * | 3/2011 | Horvitz et al. | 707/706 |
| 7,933,914 B2 | 4/2011 | Ramsey et al. | |
| 7,937,582 B1 | 5/2011 | Lee | |
| 7,966,564 B2 | 6/2011 | Catlin et al. | |
| 8,020,206 B2 | 9/2011 | Hubbard et al. | |
| 8,046,227 B2 | 10/2011 | Starkie | |
| 8,050,935 B2 * | 11/2011 | Plutowski et al. | 705/1.1 |
| 8,103,676 B2 | 1/2012 | Bedrax-Weiss et al. | |
| 8,135,704 B2 * | 3/2012 | Hyder et al. | 707/722 |
| 8,135,831 B2 | 3/2012 | Sinclair et al. | |
| 8,150,859 B2 | 4/2012 | Vadlamani et al. | |
| 8,161,066 B2 | 4/2012 | Spivack et al. | |
| 8,166,010 B2 | 4/2012 | Ives | |
| 8,176,079 B1 | 5/2012 | Sperius | |
| 8,190,684 B2 | 5/2012 | Spivack et al. | |
| 8,200,617 B2 | 6/2012 | Spivack et al. | |
| 8,275,796 B2 | 9/2012 | Spivack et al. | |
| 8,281,361 B1 | 10/2012 | Schepis et al. | |
| 8,438,124 B2 | 5/2013 | Spivack et al. | |
| 8,539,552 B1 * | 9/2013 | Grabelsky et al. | 709/225 |
| 8,688,742 B2 | 4/2014 | Fischer et al. | |
| 2001/0003828 A1 * | 6/2001 | Peterson et al. | 709/219 |
| 2001/0049700 A1 | 12/2001 | Ichikura | |
| 2002/0023122 A1 | 2/2002 | Polizzi et al. | |
| 2002/0049689 A1 | 4/2002 | Venkatram | |
| 2002/0052894 A1 | 5/2002 | Bourdoncle et al. | |
| 2002/0055936 A1 | 5/2002 | Cheng et al. | |
| 2002/0059188 A1 * | 5/2002 | Nomura et al. | 707/1 |
| 2002/0059223 A1 | 5/2002 | Nash et al. | |
| 2002/0069100 A1 | 6/2002 | Arberman | |
| 2002/0077803 A1 | 6/2002 | Kudoh et al. | |
| 2002/0082900 A1 | 6/2002 | Johnson | |
| 2002/0099696 A1 | 7/2002 | Prince | |
| 2002/0099737 A1 | 7/2002 | Porter et al. | |
| 2002/0103777 A1 | 8/2002 | Zhang | |
| 2002/0103920 A1 * | 8/2002 | Berkun et al. | 709/231 |
| 2002/0123957 A1 * | 9/2002 | Notarius et al. | 705/37 |
| 2002/0147748 A1 | 10/2002 | Huang et al. | |
| 2002/0152113 A1 * | 10/2002 | Butz | 705/11 |
| 2002/0161626 A1 | 10/2002 | Plante et al. | |
| 2002/0184111 A1 | 12/2002 | Swanson | |
| 2002/0184191 A1 * | 12/2002 | Marpe et al. | 707/3 |
| 2002/0194154 A1 | 12/2002 | Levy et al. | |
| 2002/0194201 A1 | 12/2002 | Wilbanks et al. | |
| 2003/0009536 A1 * | 1/2003 | Henderson et al. | 709/219 |
| 2003/0028871 A1 | 2/2003 | Wang et al. | |
| 2003/0046344 A1 | 3/2003 | Kumhyr et al. | |
| 2003/0074356 A1 | 4/2003 | Kaler et al. | |
| 2003/0093551 A1 | 5/2003 | Taylor et al. | |
| 2003/0120730 A1 | 6/2003 | Kuno et al. | |
| 2003/0126136 A1 * | 7/2003 | Omoigui | 707/10 |
| 2003/0133556 A1 | 7/2003 | Naik et al. | |
| 2003/0144892 A1 | 7/2003 | Cowan et al. | |
| 2003/0144988 A1 | 7/2003 | Nareddy et al. | |
| 2003/0149934 A1 | 8/2003 | Worden | |
| 2003/0158937 A1 * | 8/2003 | Johal et al. | 709/224 |
| 2003/0163513 A1 | 8/2003 | Schaeck et al. | |
| 2003/0177111 A1 * | 9/2003 | Egendorf et al. | 707/3 |
| 2003/0208472 A1 | 11/2003 | Pham | |
| 2004/0012773 A1 | 1/2004 | Puttkammer | |
| 2004/0054671 A1 | 3/2004 | Cohen et al. | |
| 2004/0073430 A1 | 4/2004 | Desai et al. | |
| 2004/0083199 A1 * | 4/2004 | Govindugari et al. | 707/1 |
| 2004/0083211 A1 | 4/2004 | Bradford | |
| 2004/0088325 A1 | 5/2004 | Elder et al. | |
| 2004/0093381 A1 * | 5/2004 | Hodges et al. | 709/204 |
| 2004/0111386 A1 * | 6/2004 | Goldberg et al. | 707/1 |
| 2004/0122977 A1 * | 6/2004 | Moran et al. | 709/246 |
| 2004/0158455 A1 | 8/2004 | Spivack et al. | |
| 2004/0162773 A1 | 8/2004 | Del Rey et al. | |
| 2004/0181525 A1 | 9/2004 | Itzhak et al. | |
| 2004/0181604 A1 | 9/2004 | Immonen | |
| 2004/0194181 P1 | 9/2004 | Iwaki | |
| 2004/0210602 A1 | 10/2004 | Hillis et al. | |
| 2004/0220893 A1 | 11/2004 | Spivack et al. | |
| 2004/0230572 A1 * | 11/2004 | Omoigui | 707/3 |
| 2004/0230634 A1 * | 11/2004 | Busaba et al. | 708/651 |
| 2004/0230676 A1 | 11/2004 | Spivack et al. | |
| 2004/0249795 A1 | 12/2004 | Brockway et al. | |
| 2004/0260680 A1 | 12/2004 | Best et al. | |
| 2004/0260701 A1 * | 12/2004 | Lehikoinen et al. | 707/10 |
| 2005/0004978 A1 * | 1/2005 | Reed et al. | 709/203 |
| 2005/0015357 A1 * | 1/2005 | Shahidi | 707/1 |

(56) References Cited

U.S. PATENT DOCUMENTS

| | | |
|---|---|---|
| 2005/0021862 A1 | 1/2005 | Schroeder et al. |
| 2005/0027708 A1* | 2/2005 | Mueller et al. .................. 707/10 |
| 2005/0055644 A1 | 3/2005 | Stockton |
| 2005/0080775 A1 | 4/2005 | Colledge et al. |
| 2005/0086206 A1 | 4/2005 | Balasubramanian et al. |
| 2005/0114487 A1* | 5/2005 | Peng et al. .................. 709/223 |
| 2005/0131778 A1 | 6/2005 | Bennett et al. |
| 2005/0144158 A1 | 6/2005 | Capper et al. |
| 2005/0144162 A1 | 6/2005 | Liang |
| 2005/0149510 A1 | 7/2005 | Shafrir |
| 2005/0154746 A1 | 7/2005 | Liu et al. |
| 2005/0160065 A1* | 7/2005 | Seeman ............................. 707/1 |
| 2005/0165642 A1* | 7/2005 | Brouze et al. .................. 705/14 |
| 2005/0165743 A1 | 7/2005 | Bharat et al. |
| 2005/0177568 A1 | 8/2005 | Diamond et al. |
| 2005/0210000 A1 | 9/2005 | Michard |
| 2005/0267872 A1 | 12/2005 | Galai et al. |
| 2005/0278309 A1 | 12/2005 | Evans et al. |
| 2005/0278390 A1 | 12/2005 | Kaler et al. |
| 2006/0004703 A1 | 1/2006 | Spivack et al. |
| 2006/0004732 A1 | 1/2006 | Odom |
| 2006/0004892 A1 | 1/2006 | Lunt et al. |
| 2006/0020596 A1 | 1/2006 | Liu et al. |
| 2006/0026147 A1 | 2/2006 | Cone et al. |
| 2006/0031288 A1 | 2/2006 | Ter Horst et al. |
| 2006/0074726 A1 | 4/2006 | Forbes et al. |
| 2006/0074980 A1 | 4/2006 | Sarkar |
| 2006/0085788 A1 | 4/2006 | Amir et al. |
| 2006/0151507 A1 | 7/2006 | Swartz et al. |
| 2006/0168510 A1 | 7/2006 | Bryar et al. |
| 2006/0184617 A1 | 8/2006 | Nicholas et al. |
| 2006/0200434 A1 | 9/2006 | Flinn et al. |
| 2006/0213976 A1 | 9/2006 | Inakoshi et al. |
| 2006/0235873 A1 | 10/2006 | Thomas |
| 2006/0242013 A1 | 10/2006 | Agarwal et al. |
| 2006/0242574 A1 | 10/2006 | Richardson et al. |
| 2006/0248045 A1 | 11/2006 | Toledano et al. |
| 2006/0259357 A1 | 11/2006 | Chiu |
| 2006/0265397 A1* | 11/2006 | Bryan et al. .................. 707/10 |
| 2006/0287989 A1 | 12/2006 | Glance |
| 2007/0016771 A1 | 1/2007 | Allison et al. |
| 2007/0027865 A1 | 2/2007 | Bartz et al. |
| 2007/0038610 A1* | 2/2007 | Omoigui ............................ 707/3 |
| 2007/0038643 A1 | 2/2007 | Epstein |
| 2007/0050338 A1 | 3/2007 | Strohm et al. |
| 2007/0061198 A1 | 3/2007 | Ramer et al. |
| 2007/0081197 A1 | 4/2007 | Omoigui |
| 2007/0118802 A1 | 5/2007 | Gerace et al. |
| 2007/0121843 A1 | 5/2007 | Atazky et al. |
| 2007/0124202 A1 | 5/2007 | Simons |
| 2007/0143502 A1 | 6/2007 | Garcia-Martin et al. |
| 2007/0174270 A1 | 7/2007 | Goodwin et al. |
| 2007/0179954 A1 | 8/2007 | Kudoh et al. |
| 2007/0203903 A1 | 8/2007 | Attaran Rezaei et al. |
| 2007/0208703 A1 | 9/2007 | Shi et al. |
| 2007/0208714 A1 | 9/2007 | Ture et al. |
| 2007/0220893 A1 | 9/2007 | Woltmann et al. |
| 2007/0260598 A1 | 11/2007 | Odom |
| 2008/0010291 A1 | 1/2008 | Poola et al. |
| 2008/0010292 A1 | 1/2008 | Poola |
| 2008/0021924 A1 | 1/2008 | Hall et al. |
| 2008/0034058 A1 | 2/2008 | Korman et al. |
| 2008/0059519 A1 | 3/2008 | Grifftih |
| 2008/0091656 A1 | 4/2008 | Charnock et al. |
| 2008/0109212 A1 | 5/2008 | Witbrock et al. |
| 2008/0147788 A1* | 6/2008 | Omoigui ........................ 709/203 |
| 2008/0148193 A1 | 6/2008 | Moetteli |
| 2008/0162498 A1* | 7/2008 | Omoigui ........................ 707/10 |
| 2008/0172293 A1 | 7/2008 | Raskin et al. |
| 2008/0189267 A1 | 8/2008 | Spivack et al. |
| 2008/0235383 A1 | 9/2008 | Schneider |
| 2008/0243838 A1 | 10/2008 | Scott et al. |
| 2008/0262964 A1 | 10/2008 | Bezos et al. |
| 2008/0270428 A1 | 10/2008 | McNamara et al. |
| 2008/0287096 A1 | 11/2008 | Aaltonen et al. |
| 2008/0306959 A1 | 12/2008 | Spivack et al. |
| 2009/0006974 A1 | 1/2009 | Harinarayan et al. |
| 2009/0012991 A1 | 1/2009 | Johnson et al. |
| 2009/0030982 A1 | 1/2009 | Spivack et al. |
| 2009/0076887 A1 | 3/2009 | Spivack et al. |
| 2009/0077062 A1 | 3/2009 | Spivack et al. |
| 2009/0077094 A1 | 3/2009 | Bodain |
| 2009/0077124 A1 | 3/2009 | Spivack et al. |
| 2009/0077531 A1 | 3/2009 | Miloslavsky et al. |
| 2009/0089278 A1 | 4/2009 | Poola et al. |
| 2009/0089286 A1 | 4/2009 | Kumar et al. |
| 2009/0106307 A1 | 4/2009 | Spivack |
| 2009/0138565 A1 | 5/2009 | Shiff et al. |
| 2009/0144240 A1 | 6/2009 | Singh et al. |
| 2009/0144612 A1 | 6/2009 | Ishii et al. |
| 2009/0171984 A1 | 7/2009 | Park et al. |
| 2009/0192972 A1 | 7/2009 | Spivack et al. |
| 2009/0234711 A1 | 9/2009 | Ramer et al. |
| 2009/0240638 A1 | 9/2009 | Kirpal et al. |
| 2009/0254414 A1 | 10/2009 | Schwarz et al. |
| 2009/0254971 A1 | 10/2009 | Herz et al. |
| 2009/0327304 A1 | 12/2009 | Agarwal et al. |
| 2010/0004975 A1 | 1/2010 | White et al. |
| 2010/0046842 A1 | 2/2010 | Conwell |
| 2010/0049842 A1 | 2/2010 | Koski |
| 2010/0057815 A1 | 3/2010 | Spivack et al. |
| 2010/0070448 A1 | 3/2010 | Omoigui |
| 2010/0070542 A1 | 3/2010 | Feinsmith |
| 2010/0094952 A1* | 4/2010 | Lindgren et al. .............. 709/219 |
| 2010/0100545 A1 | 4/2010 | Jeavons |
| 2010/0153160 A1 | 6/2010 | Bezemer et al. |
| 2010/0223295 A1* | 9/2010 | Stanley et al. ................. 707/794 |
| 2010/0235918 A1 | 9/2010 | Mizrahi et al. |
| 2010/0262592 A1 | 10/2010 | Brawer et al. |
| 2010/0268596 A1 | 10/2010 | Wissner et al. |
| 2010/0268700 A1 | 10/2010 | Wissner et al. |
| 2010/0268702 A1 | 10/2010 | Wissner et al. |
| 2010/0268720 A1 | 10/2010 | Spivack et al. |
| 2011/0066525 A1 | 3/2011 | Huist et al. |
| 2012/0010867 A1* | 1/2012 | Eder ................................ 703/13 |
| 2013/0132386 A1* | 5/2013 | Runchey ....................... 707/736 |
| 2013/0204872 A1* | 8/2013 | Runchey ....................... 707/736 |
| 2014/0032529 A1 | 1/2014 | Chang |

FOREIGN PATENT DOCUMENTS

| | | |
|---|---|---|
| KR | 20010028737 A | 4/2001 |
| KR | 20040017824 A | 2/2004 |
| KR | 20050023583 A | 3/2005 |
| KR | 20060046522 | 5/2006 |
| KR | 20060117707 | 11/2006 |
| KR | 2007006116 A | 6/2007 |
| WO | 2007032003 A2 | 3/2007 |
| WO | WO-2010120925 A2 | 10/2010 |
| WO | WO-2010120929 A2 | 10/2010 |
| WO | WO-2010120934 A2 | 10/2010 |
| WO | WO-2010120941 A2 | 10/2010 |

OTHER PUBLICATIONS

M.P. Evans, and S.M. Furnell—"The Resource Locator Service: fixing a flaw in the web"—Computer Networks—vol. 37, Issues 3-4, Nov. 5, 2001, pp. 307-330.*

"SEAL ~ A Framework for Developing SEmanatic PortALS,"~ Nenad Stojanovic, Aleanander Maedche, Steffen Staab, Rudi Studer and York Sure, K=CAP'01', Oct. 22-23, 2001 ACM, pp. 155-162.

"Improved markup language for semantic Web using object oriented technology, 21-24"—Kangchan, et al., IEEE, vol. 1, Sep. 2003, pp. 330-334.

"Ontology-Driven Peer Profiling in Peer-to-Peer Enabled Semantic Web"—Olena Parhomenko, Yugyung Lee, E.K. Park-CIKM'03 Information and Knowledge Management Nov. 2003, pp. 564-567.

"Re-integrating the research record,"—Myers et al., IEEE vol. 5, May-Jun. 2003, pp. 44-50.

"Semanatic-Based Approach to Component Retrieval,"—Vijayan Sugumaran and Veda C. Storey —ACM SIGMIS Database vol. 24, issue 3 Aug. 2003, pp. 8-24.

(56) References Cited

OTHER PUBLICATIONS

W. Fang et al., "Toward a Semantic Search Engine Based on Ontologies," Proc. 4th Int'l Conf. on Mach. Learning and Cybernetics, Aug. 2005, pp. 1913-1918.
'a klog apart' [online], Dijest.com 2003, Retrieved from the Internet : URL: http://www.dijest.com/aka/2003/06/20.html>, 9 pages.
'Blogs as information spaces,' Reflective Surface, 2003. Retrieved from the Internet :<URL: http://log.reflectivesurface.com/2003/12/>, 6 pages.
'Development Notebook,' Dannyayers, 2003, Retrieved from the Internet: URL: webarchive.org/web.20031012055838/http://dannyayers.com/ideagraph-blog/archives/cat_jemblog.html>, 6 pages.
'Organizing weblogs by topic,' Read/Write Web, 2003, Retrieved from the Internet: <URL: http://www.readwriteweb.com/archives/organizing_webl.php>, 3 pages.
'Semantic Email,' University of Washington, Retrieved from the Internet on May 3, 2007, <URL:http://www.cs.washington.edu/research/semweb/email/html>, 2 pages.
'Semantic link,' Meta, 2005, Retrieved on the Internet:<URL http://meta.wikimedia.org/wiki/Semantic_link>, 1 page.
A. Hotho et al., "Information Retrieved in Folksonomies: Search and Ranking," ESWC 2006, pp. 411-426.
Cass, "A Fountain of Knowledge," IEEE Spectrum, Jan. 2004, pp. 68-75.
Choi. Y. et al., "Refinement Method of Post-Processing and Training for Improvement of Automated Text Classification," Computational Science and its Applications—ICCSA 2006, International Conference, Glasgow. UK, May 8-11, 2006, pp. 298-308.
Devedžič, "A Survey of Modern Knowledge Modeling Techniques," Expert Systems with Applications, vol. 17, Issue 4, Nov. 1999, pp. 275-294.
European Supplementary Search Report EP 06 839486.1 Dated Dec. 27, 2010 pp. 1-8.
International Search Report PCT/US07/75379; dated Aug. 5, 2008.
International Search Report PCT/US2008/010596 dated Mar. 24, 2009, pp. 1-2.
International Search Report PCT/US2008/011474 dated May 29, 2009, pp. 1-2.
International Search Report PCT/US2010/031090 dated Nov. 2, 2010; pp. 1-3.
International Search Report PCT/US2010/031096 dated Nov. 22, 2010; pp. 1-3.
International Search Report PCT/US2010/03110 dated Nov. 28, 2010; pp. 1-3.
International Search Report PCT/US2010/031111 dated Nov. 26, 2010; pp. 1-3.
International Search Report PCT/US2010/039381 dated Jan. 5, 2011, pp. 1-3.
Kashyap et al., "Semantic and Schematic Similarities Between Database Objects: a Context-Based Approach," VLUB Journal, © Springer-Verlag 1996, pp. 1-29.
Lee et al., "Development of a Concurrent Mold Design System: a Knowledge-based Approach," Computer Integrated Manufacturing Systems, vol. 10, Issue 4, Oct. 1997, pp. 287-307.
Microsoft Computer Dictionary, p. 181, Microsoft Press, 5th ed., 2002.
Parkhomenko, O. et al., "Ontology Driven Peer Profiling in Peer to Peer Enabled Semantic Web," CIKM 03, pp. 564-557.
S. Decker and M. Frank, "The Social Semantic Desktop," DERI Technical Report May 2, 2004, May 2004, pp. 1-7.
Written Opinion PCT/US208/010596 dated Mar. 24, 2009, pp. 1-5.
Written Opinion PCT/US2007/75379 dated Aug. 5, 2008, pp. 1-7.
Written Opinion PCT/US2008/010337 dated Dec. 28, 2009; pp. 1-3.
Written Opinion PCT/US2008/011474 dated May 29, 2009, pp. 1-5.
Written Opinion PCT/US2009/002867 dated Dec. 18, 2009; pp. 1-5.
Written Opinion PCT/US2010/030190; dated Nov. 2, 2010; pp. 1-6.
Written Opinion PCT/US2010/031096 dated Nov. 22, 2010dated: pp. 1-4.
Written Opinion PCT/US2010/031101 dated Nov. 26, 2010dated: pp. 1-4.
Written Opinion PCT/US2010/031111 dated Nov. 26, 2010; pp. 1-6.
Written Opinion PCT/US2010/039381 dated Jan. 5, 2011 pp. 1-4.
X. Shen, B. Tan, and X. Zhai, "Context-sensitive information retrieval using implicit feedback," Proc. SIGIR '05, pp. 43-50.
Fry, "Assembling a Parallel Corpus from RSS News Feed," Artificial Intelligence Center, 2005, pp. 59-62.
Aleman-Meza, et al., "Ranking Complex Relationships on the Semantic Web," IEEE Internet Computing, vol. 9, Issue 3, May/June 2005, pp. 37-44.
Sheth, et al., "Semantic (Web) Technology in Action: Ontology Driven Information Systems for Search, Integration, and Analysis," IEEE Data Engineering Bulletin, vol. 26, No. 4, Dec. 2003, 11 pages.
Artz, et al., "A Survey of Trust in Computer Science and the Semantic Web," Web Semantics: Science, Services and Agents on the World Wide Web, vol. 5, Copyright 2007, 58-71.
The American Heritage College Dictionary, 4th Edition, Houghton Mifflin Company, Boston, MA, Copyright 2002, p. 1260.
Josang, et al., "A Survey of Trust and Reputation Systems for Online Service Provision," Decision Support Systems, vol. 43. Copyright 2007, pp. 618-614.

* cited by examiner

SEMANTIC WEB PORTAL AND PLATFORM

PRIORITY CLAIM

The present invention is a continuation of U.S. patent application Ser. No. 12/197,207, now U.S. Pat. No. 8,275,796 B2, filed Aug. 22, 2008 entitled "SEMANTIC WEB PORTAL AND PLATFORM" which is a continuation of U.S. patent application Ser. No. 11/062,125, now U.S. Pat. No. 7,433,876 B2, filed Feb. 19, 2005, entitled "SEMANTIC WEB PORTAL AND PLATFORM" which claims priority to U.S. Provisional Patent Application No. 60/546,794 filed on Feb. 23, 2004, the content of which are incorporated herein by reference.

BACKGROUND OF THE INVENTION

1. Field of the Invention

The present invention relates to computer software and Internet applications. More specifically, the invention relates to software enabling improved communication, management of knowledge, and connectivity among entities over a computer network.

2. Introduction

Present, widely used, public web portals typically organize information according to topics rather than type. In instances where information is organized by type, the various types between portals are often inconsistent and unstructured. The same portals also do not organize information (stored on behalf of its users) utilizing relationships that information has with other information, such as people and places, on the network or in the portal. Public portals organize data on the public web using public taxonomies and fail to display or convey information on connections between information and knowledge in their directories. Furthermore, they fail to organize personal or group information. Although enterprise portals are capable of organizing group or team information, they are often inaccessible to the public or to individuals and are expensive and monolithic. Even less utilitarian and intelligent with respect to organizing information are the popular online search engines which are completely unstructured and typically organize information and data by relevance to keywords.

Therefore, what is needed is a single location and application on a network where a user can organize public, group, and private/personal information and have this single, location accessible to the public. What is needed is a new, ontology-driven portal that organizes all three categories of data according to various "facets" using underlying ontologies to define each "facet" and wherein any type of information can be classified and linked to other types of information. That is, what is needed is an application that enables a user to effectively utilize and manage knowledge and data the user posses and allows other users to effectively and seamlessly benefit from the user's knowledge and data over a computer network.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In one aspect of the invention, a method of processing content created by a user utilizing a semantic, ontology-driven portal on a computer network is described. The semantic portal application provides the user with a content base, such as a semantic form or meta-form, for creating a semantic posting. The semantic portal utilizes a knowledge data structure, such as a taxonomy or ontology, in preparing a semantic posting based on the information provided by the user via the content base. The semantic portal application prepares a preview of a semantic posting for evaluation by the user. The semantic posting is then either modified by the user or accepted and posted by the user for external parties to view.

In another aspect of the invention, a method of sharing information on a semantic-based network is described. A semantic portal application intercepts an e-mail message via an outgoing mail server or an incoming mail server. It then creates a semantic object from the e-mail message by examining syntax of the e-mail message inline, for example by detecting brackets, colons, and certain keywords indicating data type. The semantic posting is then make viewable by the public.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
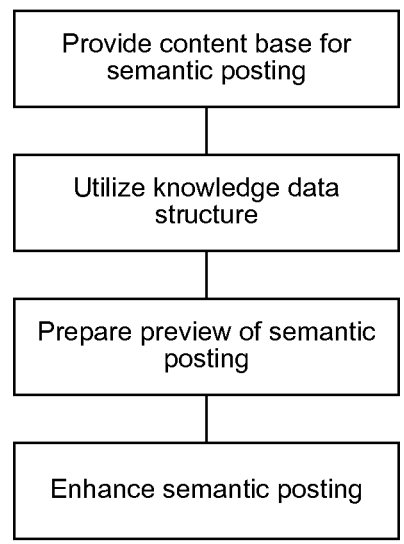
FIG. 1 is a flow diagram of a process of creating a semantic posting in accordance with one embodiment of the present invention.
Figure 2:
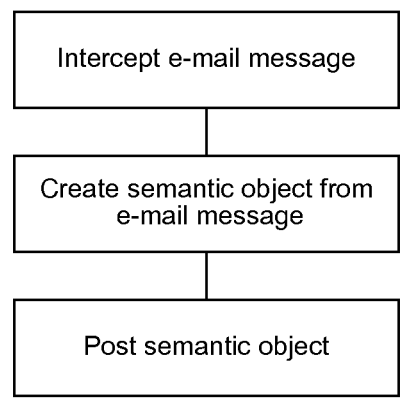
FIG. 2 is a flow diagram of a process of sharing information on a semantic network in accordance with one embodiment of the present invention.
Figure 3:
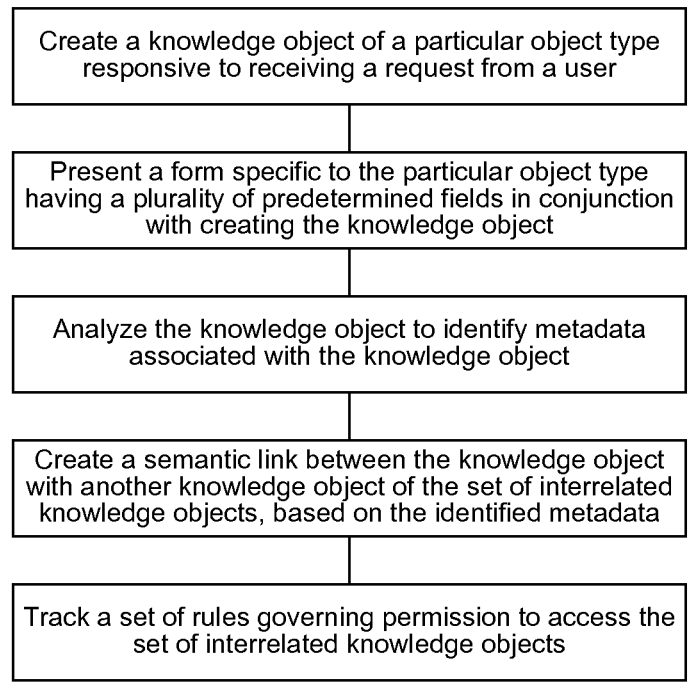
FIG. 3 is a flow diagram of a process of managing interrelated knowledge objects in accordance with one embodiment of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The Metaweb is the next-generation of the Web, based on semantic microcontent. Radar Networks is the Metaweb company. We run the Metaweb Portal on our Metaweb platform, and we make Metaweb software for end-users and enterprises.

In Phase 1 we will create a Web-based Metaweb Portal running on the Radar Platform. The portal will be designed to become the "Hub of the Semantic Web." Users may interact with the Portal via any Web browser, email client, RSS client, or XML-RPC or SOAP client.

The Portal will provide free services as well as premium services to users. The free services will enable anyone to search the portal and to create their own ad-supported public or private Metawebs. Premium services will include paid listings to premium Metawebs, additional storage space, additional security/privacy, larger numbers of members per Metaweb, marketing, commerce, and priority performance, co-branding, no-ads or run-your-own-ads on your Metaweb, priority or longer-lived agents, etc. Simultaneously, or soon after, we will give away a free, optional, open-source desktop tool for publishing and subscribing to the Metaweb. This tool will also have built-in capabilities for sharing microcontent objects with other users via email and/or p2p and/or IM.

In Phase 2 we will provide a free, low-end, open-source Metaweb Server, that enables anyone to host their own Metawebs on their own machine. In Phase 3 we will sell a commercial Metaweb Server that enables any group or enterprise to run their own industrial-strength Metaweb service on the network. On this server we will provide various applications for enterprise collaboration, KM, etc.—based on the technology we develop for the public Metaweb Portal.

The first applications of the Metaweb Portal will be to:
Provide every individual user, or group, with their own Metaweb—a new kind of site about them, which can link to/from Metaweb sites created by their friends and by groups they have relationships with. They can use their Metawebs for:
  Building a new kind of homepage about themselves, their group or their organization or product
  Participating in communities and social networks
  Publishing their ideas and information
  Marketing things to others
  Requesting things from others
  Publishing a semantic weblog
  Sharing knowledge with a group or team
  Managing projects and tasks with groups
  Sharing calendars
  Sharing files and data
Provide a top-level ontology of Metaweb node types
Provide top-level taxonomies of Knodes for topics (from the open directory, dmoz.org taxonomy of topics, and possibly the Library of Congress taxonomy, as well as other taxonomies that can be added by users, such as a medical taxonomy, etc.)
Seed the network by creating top-level public Metawebs for particular topics of interest, such as:
  Music (all about music)
  Places
    Countries (all about various countries)
      Cities (all about various cities)
      Destinations (places)
  Sports (all about sports)
  Business
    Industries
    Professions
  Literature (all about literature)
  Politics
  Kids
  Hobbies
    Cooking
    Collecting
  Technology (A Metaweb about technology)
  Products (A Metaweb about products)
    Cameras
    Computers
    Software
    Autos
  Cultures
    Religion
    Ethnic
    National
  Lifestyles Main Features of the Portal
Login/Join
  When joining Metaweb the user creates an account. A user account includes a login name, a password, payment info, plus one or more alternate identity personas each with its own detailed and extensible user profiles and preferences. When logged into their account, users may create content via their identities, and may see content and enact roles that their identities have permissions for. If users do not login then by default they are considered to be logged in as "Guests" with corresponding roles and permissions (usually public-read-only, except where public-read-write is permitted).

Create/Admin a Metaweb
  A Metaweb is semantic web site comprised of interrelated knowledge objects ("knodes"). To create a new Metaweb a user must login to their account. From their account a user can start any number of Metawebs.
  The default type of Knode is a "Node." A Node is a generic form that has basic header info, an admin section, and a large freeform area that can contain formatted content. As well as generic "Nodes," Knodes can also be set to other types in order to embody particular preset semantic structure such as a Person, Project, Document, Question, Topic, etc.
  Within the body of a Knode users may add and format content in a manner that is similar to Wikis That is they can easily create new Knodes by using particular syntax while adding content, and they may use particular syntax to format content and add semantic links.
  Each Metaweb has its own unique namespace which is the equivalent of a domain on the Web. All knodes in a Metaweb are addressed within the namespace of that Metaweb.
  Every Knode in a Metaweb can be accessed via a Web page. When a new Knode is created, unless otherwise specified, it is defaulted to type=Page. The type setting of a Knode can be changed to any valid type after the Knode is created (however if content has been filled into the Knode it may or may not map into the new type structure. In such case, content will not be lost but will not be displayed if invalid, or the user will be given a choice of how to map into the new structure?).
  Every Metaweb has its own profile and settings. These include permissions governing how Guests and registered users may access and interact with that Metaweb. By default, unless otherwise specified, a new Metaweb is private and can only be viewed by the admin who creates it. Other setting combinations enable it to be seen, read, and/or edited by "public" or by accounts for particular individuals, or by individuals who are members of particular groups. Permissions are inherited by all Knodes in a Metaweb, but can be excepted on a per Knode level. All sub-Knodes inherit the permissions of their parent Knode unless excepted.

Post/Edit
  Posting is the act of adding content to a Metaweb. When posting the user selects the persona they are posting "from," and the Metaweb(s) they are posting "to." They must also select a type of Knode to post, or use the default Knode for that Metaweb and/or Metaweb section they are posting to.
  It is possible to cross-post to any number of Metawebs, although postings will only be accepted by Metawebs for which the current user account has posting-permissions. The policies of posting to a particular Metaweb are determined by the admin of that Metaweb. Posting may be open or moderated, and may be free or paid.

The author of a Knode is the default admin for the object. However if an object is posted into a Metaweb that is administered by someone else, then the administrator of the target Metaweb also receives admin rights for the instance of the posted object within their Metaweb (but not necessarily for other instances of the object in other Metawebs).

All postings that a user creates are objects that live in their account. When they post to a particular Metaweb an instance is created in that Metaweb (even if it is their own Metaweb). This enables them to change the master-Knode as a shortcut for changing all the instances of that Knode wherever they exist, or they can change just particular instances without affecting the master Knode.

Templates and Wizards

A rich ontology of templates for various types of Knodes is provided. Users may configure their own instances of these templates (by showing/hiding slots and by reordering slots), and they may also subclass and enhance these templates (by adding new slots), and they may create completely new and custom ontology branches and templates (within their namespaces only).

Wizards are also provided to help users quickly setup, instantiate and author particular types of Metawebs for common purposes including:
- Content (Home page, Weblog, newsletter, newsfeed, photo album, catalog, reviews)
- Group/Team (a group of people and/or other groups and related resources, discussions, calendars, projects, knowledge, content, etc.)
- Project/Task (for managing a project and related resources)
- Calendar (for managing events over time and related resources)
- Knowledge base (for creating a generic network of knowledge about some topic or interest)
- Trading Post (My offers and request for things)

Agents

Users may create agents that operate on Metawebs.

An agent applies some behavior to some input and produces some output. Agents may take the output of other agents as input.

The most common type of agent is a Subscription. A Subscription aggregates content from one or more Metawebs according to rules. To subscribe a user must login to their account and create a Subscription. A Subscription specifies one or more Sources to subscribe to, as well as any rules for how to get content (push or pull), and how often, and how to filter the content from the sources, and how to route the content for the subscription (to my personal Metaweb, to an RSS feed just for me, to my email address, etc.). Subscriptions can be made to entire Metawebs or to particular Pages or Knodes within them. Subscriptions can also be piped into other subscriptions (every subscription is a virtual source) to create composite subscriptions. Subscriptions can also be syndicated into other Metawebs (true syndication; I can subscribe to particular items from your Metaweb and pipe that content into my Metaweb, according to rules).

Note that Subscriptions, or in fact any other type of Agents, can be turned shared with others, as Knodes themselves.

Other types of common agents include:
- Matching (find Knodes that match a particular existing Knode, according to a ruleset, and notify the other party and/or me or take some other action)
- Searching (look for Knodes that satisfy some rule and notify me if they are found instantly, hourly, daily, weekly, monthly)
- Monitoring (track a Knode and let me know if/when it changes)
- Bidding (make bids automatically on an item I want to buy according to my rules)

Every user's Metaweb account has a section in it where their agents can be managed and interacted with.

Search

The Metaweb portal provides for semantic searching across any set of Metawebs and dimensions via a search interface.

Navigation

The Metaweb Portal has the following navigational structure:
- Metaweb Home
    - Public section
    - Basic Search
    - Advanced Search
    - Join/Login
    - About
    - Help
    - Directory (filterable directory)
        - All Metawebs (registry of Metawebs)
            - By priority (featured, normal)
            - By author
            - By publisher
            - By endorser
            - By access popularity (relative frequency of access)
            - By posting popularity (relative frequency of postings)
            - By ratings (reviews)
            - By date created
            - By last modified date
            - By status (active, expired)
            - By access (public, private, read-only, read-write)
            - By geography (relevant geography to item)
            - By topic
            - By content rating
            - By access terms (free, premium)
            - By posting terms (free, premium)
            - By number of registered users
        - Knodes (directory of all Knodes across all Metawebs)
            - By type
            - By author
            - By publisher
            - By endorser
            - By Metaweb (that Knode appears in)
            - By access popularity (relative frequency of access)
            - By posting popularity (relative frequency of postings)
            - By ratings (reviews)
            - By date created
            - By last modified date
            - By status (active, expired)
            - By access (public, private, read-only, read-write)
            - By administration (unmoderated, moderated)
            - By reputation (how much can I trust it, based on reputation of author or authors)
            - By geography (relevant geography to item)
            - By topic
            - By content rating
            - By access terms (free, premium)
            - By posting terms (free, premium)
            - By number of registered users
        - Featured Metawebs
        - Music (all about music)
        - Places
            - Countries (all about various countries)
            - Cities (all about various cities)
            - Destinations (places)

Sports (all about sports)
Business
   Industries
   Professions
Literature (all about literature)
Politics
Kids
Hobbies
   Cooking
   Collecting
Technology (A Metaweb about technology)
Products (A Metaweb about products)
   Cameras
   Computers
   Software
   Autos
Cultures
   Religion
   Ethnic
   National
Lifestyles
Special Sections
   What's New
   Recent Posts
   Popular Posts
   Featured Posts
   Popular Metawebs
   Featured Metawebs
   Ads (like on Google, along the side)
Private Accounts section
My Account
   My Metawebs (Metawebs I create or administer or simply that I read)
   Default Personal/group Metaweb (that every account starts with and can author)
     Content
     My homepage
     My weblog
     My calendar
     My news
     My files
     My offers
       Products
       Services
       Jobs
       Real-estate
       For-sale
     My requests
     My family (optional)
     My friends
     My colleagues
     My music (that I like)
     My books (that I like)
     My products (that I like)
     My opinions (reviews, editorials)
     My resume
     My organizations
     My causes
     My interests (topics)
     My projects
     My files (that I wrote or share)
     My ideas
     My photos
     My websites
     Administration interface (if I have permissions)
     Who can see that it exists
     Who can admin
       Who is root
       Who can moderate/edit
     Who can read
     Who can post/write
     Who can make agents here
     Who can delete things
     Who is banned
     Who has to pay for what, does not have to pay
     What types are allowed
     What is the structure of the Metaweb
     What are the settings for the Metaweb
     What are the stats for the Metaweb
     What is the layout/design of this Metaweb
   Other Metawebs
     Created by me . . .
     Not created by me . . .
   My Knodes (this is a way for me to centrally view and manage all Knodes—that is either individual master-copies or instances of Knodes as opposed to Metawebs which are publications comprised of many Knodes—that I publish or subscribe to, across all Metawebs that I create or aggregate)
   Outgoing
     (way to admin all Knodes I have posted)
   Incoming
     (way to read all Knodes I receive via agents, messages, etc.)
   Folders
     (collections of pointers to Knodes I want to track; can be created manually by me and/or automatically by agents/filters)
   My Agents
   (way to manage all the agents I have, such as my subscriptions)
   My Relationships
   (way to manage
   My Personal Info
   Payment info
   Contact info
   Demographics
   Settings
   My Identities
     Identity x
     Profile
     Settings
     Identity y
     Profile
     Settings
   My Stats
     Usage
     Reputation/Ratings While "outward facing" services, such as Google and Yahoo!, focus on helping you work with what and who you don't know, there are currently no services that help you work with who and what you already know, and have stored on your computer. To remedy this, Hotnode processes your incoming email and instant messages, email and instant messaging notes you send to others, as well as messages you send to yourself, such as memos, to-dos, and calendar events. We help you search what you know; we help you work with people you know; we enable you to publish semantic material to particular parties (yourself, individuals, groups). In short, we Hotnode helps you manage your stuff.

Hotnode is the next-generation platform for microcontent publishing. We provide: next-generation semantic E-mail, Web pages, Weblogs and Wikis, in one easy-to-use framework.

- automated, integrated social networking.
- access to thousands of semantically-enhanced news services.
- the ability to manage your digital files better.
- the ability to do a new kind of marketing and semantic search.
- automated alerts.
- better communication, collaboration, and on-line interaction.

We provide a site where members can come and author sematic postings called hotnodes, using our Hotnode ontologies. To do this, they fill out the form for their semantic posting; Hotnode then post-processes the content of the form to generate a preview of what their "semantic posting" will look like. Depending on their preferences, Hotnode may enhance their posting in various ways, for example by automatically mining it and linking it to various other nodes in their network on our system.

Hotnode enhances your email. It blocks spam. It takes notes. It learns about your interests. It helps you collaborate with others. It helps you buy and sell. All of this can be accessed via E-mail, via a Web interface, via free desktop tools, or via a combination of all of these.

Problem Statement

Currently there are no semantics in blogs or Wikis—their authors have for example no easy way to assign topics to their postings, or to enable people to navigate blog or Wiki content by topic, type, author, or other semantic dimensions. Furthermore, readers of blogs and Wikis have no central portal where they can go to view an alphabetical list of topics to see what has been posted across lots of blogs. Currently, people use E-mail as a to-do list, to keep track of their friends, for storing addresses, for sharing files, and as a workflow management tool. Yet E-mail was not designed for any of these tasks, and, as a result, is a poor tool for handling them. People who already have blogs need a way to:

- add more semantics to their postings (i.e. semantic types, topic taxonomy, defined named slots, and a markup language to use in their content)
- add semantic search, navigation and filters to their blog
- target and market their blog and their postings more effectively to audiences they want to reach
- add true threaded discussions to their blogs
- use their blog for more purposes, for example as their personal information manager, for collaboration, etc.
- control the policies of their postings (limited control for Hotnode users; unlimited control buy our server)
- enhance their postings. Hotnode can mine their content and return marked-up version with links to related nodes in our network)
- easily add Wiki-like functionality to their blog
- do classified advertising on their blog. Hotnode lets them post offers and requests on their blogs and return them an rss feed for their matches.
- easily get related content to syndicate into their blog, related to any posting, or to any topic they cover.

People who don't have blogs need:

- a place to make their blog
- a free blogging service
- easy-to-learn (non-geeky) functionality, to get started and use it quickly
- maximum self-expressive power: their own choice of formatting and layout, lots of easy design templates to choose from as well as make their own
- help to get discovered: On Hotnode linking via social networks, topics, issues, etc., and automatic inclusion in directories with semantic navigation, is not only possible, it's a natural way of doing things Solution While "outward facing" services focus on helping you work with what you don't know and who you don't know, there are no services that help you work with what and who you do know. Hotnode can process email messages that come through it. This includes messages you send to others, messages others send to you, and messages you send to yourself (at the service). We help you search what you know; we help you work with people you know.

Hotnode enables anyone to post a semantic weblog to their existing weblog and/or to a next-generation weblog and community we host. So in their existing blog users can link to the Hotnode taxonomy and ontology to classify their content, and they can include html in their blog (or any web site for that matter) that provides a semantic navigation interface to their site; Hotnode indexes their site for them automatically. This is somewhat equivalent to the way people put the "Search my Site, provided by Google" on their web pages. Hotnode provides an API that anyone can use to put semantic search of their content into their site.

Hotnode also provides new ways to markup web content semantically so that Hotnode can do a better job of indexing it, to enable users to navigate. Hotnode also provides a way for bloggers to make our topics available on their site for navigation, so that people can navigate the content semantically within site—generating the listings on the fly. Hotnode provides a sidebar for semantic filtering and navigation that users can put into their typelist, or anywhere else in their blog. If users really want the full power of Hotnode, they should to switch to publish their blogs on the Hotnode semantic blogging service, which makes all of this even easier. Through Hotnode, users can create semantic Wiki entries. Hotnode recognizes and parses Wiki syntax inline; If users put in Wiki commands in an email they send out, such as [knowledge management], their Hotnode will create and/or link to a hotnode named "knowledge management" from the appropriate location in the body text of the hotnode for that email message. If a user for example writes [biology], Hotnode will make a new hotnode for "biology" (of unspecified type) on their Hotnode and the Hotnodes of recipients, or link to an existing node of same/similar concept, if it is found. To take another example, a user can type [person: Nova Spivack] and Hotnode will make a person hotnode or link to an existing person by that name. They can also converse with Hotnode by sending emails with questions, [? friend-of Nova Spivack] for example. Hotnode will reply with a message containing the query results from the Hotnode account, in this example with a list of Nova Spivack's friends. Hotnode turns email into a semantic wiki running on the Radar backend. Wiki entries can be private, visible only by the person who authored it (email to self), visible to a few selected recipients (email to a few selected recipients), visible to members of a list (email to an email list), or visible to all (email to public@hotnode.com). When you send a message the resulting hotnodes are shared with the recipients of the message (via their Hotnode accounts). Because Hotnode intercepts messages to/from every user, it can mine them and make a really good search index for each user, hosted on our server and only accessible by the user to which the information belongs.

We can also give users various other useful views on their data (such as what we do in Radar), via the ontology and our semantic search and filtering.

In addition to the above, Hotnode does automatic social networking: Building a social network by simply analyzing the recipients on messages, and linking these together into a representation of the social network that they are a result of. This is a secondary viral feature: Belonging to such a network makes it more likely that a member will solicit his or her friends to join the network. Hotnode looks at the user's emails as they come through and builds a social network from them automatically, based on who they correspond with. The user can then search, visualize and communicate using this network. This is totally automatic—there is no need to send or reply to "join my network" messages anymore. Hotnode learns just by seeing who talks to who.

Business Model

The main revenue will come from selling premium services and features to enterprises, and to sell the entire backend to enterprises that want to run their own nodes in the network or to run it in-house or for their private communities, customers, etc.

We are going to start by providing a the most powerful hosted blogging and wiki service on our platform, as well as a portal for our community of users. We provide semantic blogging, Website and Wiki services to individuals, groups, communities and organizations. We are the semantic equivalent of the Wikipedia or Everything2 (which we might consider acquiring or close collaboration with). Users get a basic blog and Wiki for free, without ads. We can also provide them with other semantic objects they can post to their blogs for various types of things. If a user accept ads then they get some additional free features. Users can opt-in to advanced features by subscribing to the Hotnode Pro service ($9.95/month) and paying a la carte fees for other optional additions.

We also provide a next-generation semantically enhanced email service. We will provide users with a free POP account. To enable people to continue using their current email, we provide several options: First, they can set their current service to forward their email to Hotnode. Second, their Hotnode can be set to retrieve email from other email addresses periodically or manually. Third, they can park their domains with us. Fourth, they can set Hotnode as their email proxy to their regular ISP. To get a lot of immediate usage, and motivate people to use us instead of their current ISP, we can offer free domain parking, free email and free web hosting.

With this setup Hotnode automatically processes any message received by or sent to a user's existing email address, becoming the next-generation ISP. We could partner with an existing ISP so that we don't have to build the hosting infrastructure. On the other hand we could also do it ourselves and either get bought by a big ISP or simply take over and become the next equivalent of Earthlink, for example.

Our online Hotnode service can enhance your email, even if you use only Outlook or any other email client. That is the primary viral starting feature. You can send, get, view and even create hotnodes via any email client (you can also do it via any web browser, or via Personal Radar). The automatic social networking from email is a secondary viral feature: Once a member belongs to such a network, he/she is more likely to solicit his or her friends to join Hotnode (see e.g. Plaxo). We allow free Hotnode accounts to send out only a certain number of messages per day (to block bulk spammers). If you want more you can pay. If anyone complains you lose points on your license, and if you lose x number points you go on probation and your message are marked as possibly spam. If you keep messing up we ban you. To create stickiness, Hotnode provides aggregated, semantically tagged news from around the net, providing more easily navigatable news than any other service. In the beginning, Hotnode also mines the Net and automatically creates a node about every Web page, document, person, company, etc. that is found. We send out invitations to all to join Hotnode and keep the information about them up to date. Our plan results in potentially tens of millions of users very quickly, and these services are more useful than either LinkedIn or Plaxo. The only concern is that by the time we launch people may be wary of using any social networking systems, because they are tired of getting invites all the time from their friends—in which case we might have a more subtle way of doing things. We have given it some good initial thought and will continue to refine it.

This is the first step to getting a lot of sites to start using us as their semantic engine. We provide a central ontology of templates for various types of things you can post. Also a taxonomy of nodes for topics, places, companies, products, events, etc. If we own the taxonomy, ontology and semantic search and navigation feature of every site, we own the semantic web—a way to get people to use our portal as their taxonomy and ontology. Hotnode.com becomes a central portal serving as a directory, search, hosted semantic messaging service, community and marketplace. There are also some compelling applications of this to groups/teams. A key is that this is a way to get our platform to a lot of people without requiring any new download—it works with their existing tools on day one.

Later we will sell our software to enterprises that want to take such services in house. Enterprise Hotnode servers enable organizations to host their own Hotnode accounts and services on the network.

Customers

We are primarily targeting early adopters of technology, who will want to use our enhanced email features to improve the way they interact with and use information on-line and off-line. We are also directly targeting people who have blogs already (experts), as well as the blogless masses (neophytes). Experts can use us to enhance their existing blogs in many ways. Neophytes can use us as their bloghost. Thirdly, website creators will want to use us to enhance their sites with more advanced navigational and search abilities. We are targeting consumers and business individuals equally on these fronts; enterprises will not be targeted specifically in the first phase.

Competition

When we launch, our main competitors will likely include: SixApart (Typepad and Moveable Type), Google (Blogger), Userland, LiveJournal.

Competitive Advantages

Hosting your blog on our site is the only way to get the full benefit of our platform We have more features (semantics, targeting, search, filtering, etc.)

You can create any number of blogs for yourself, and for particular groups you interact with We help you get notices (marketing, cross-posting, syndication)

We give you more expressive freedom (more design templates, widgets to use, etc.)

We also give you a built-in wiki (you can create nodes about all sorts of things)

Your blog is part of a community and marketplace (we run a portal that you are part of)

You can use your blog for more things (not just traditional blogging)

publishing info publishing rich photoalbums and playlists as your online PIM for managing projects and tasks for collaborating with groups/teams for sharing your calendar for marketing things
for classified advertising
for sharing knowledge
for sharing files
We have a great (optional) desktop tool for posting to your blog and aggregating from it
If you ever want to, you can use our server to host it all yourself
You can allow your friends to cross-post to your blog and you can cross-post to theirs
We generate multiple RSS feeds for your blog (for different filters of it)
We provide a marketplace that does matching of offers and requests that your post to your blog Hotnode Offerings Your Hotnode account provides you with many services, including:
  Proxy services (POP, HTTP)
  IM address (Jabber)
  RSS/semantic news publishing and aggregation
  Reminders
  Notifications
  Knowledge capture
  Knowledge discovery
  hotnode store and forward
  Publish and subscribe
  hotnode synchronization
  PDA/PIM Sync
  Personal profile (you can profile yourself)
  Search
  Weblog
  Wiki
  Listserv (threaded discussion)
  Calendars & Events
  Contacts
  Projects & Todos
  Notes
  Messages
  Web Favorites
  Lists (you can make lists of anything)
  Knowledge (books, music, video, software, places, restaurants, documents, products, services)
  Reviews
  Playlists
  Photoalbums
  Filesharing
  Topics directory
  Matching of offers and requests (commerce)
  Question answering (you can ask it a question and get an answer)
  Mail filtering
  Suggestions (sites you might like, products you might like, etc.)

We provide some new things users can put into their blog, that use our server's API. These include:
  Semantic search box
  Semantic directory that lets visitors navigate their content by:
  date/time
  type
  topic
  geography
  popularity
  ratings
  custom filters
  The ability to define their own custom filters and put them in as links on their navbar
  Semantic Marketplace—they can choose marketplace categories to put on their blog. They and/or visitors can post offers/requests there. We aggregate that content and look for matches. We email and/or RSS the matches we find back to the poster according to their prefs.
  The ability to create custom RSS feeds that pump content they want to put into their blog to them
  Related items (a link that shows any related items to an item, filtered semantically, from our network)
  What's new (a list of the newest items from some set of namespaces: just them, or some community)
  My friends' posts (posts from blogs of their friends—they have to tell us what blogs to mine) We provide an optional API that sites can use to call us directly to register and create nodes in our network via their own UIs using our XML/RDF templates etc.

We provide a Dashboard that makes managing addresses and hotnodes easier, and available off-line.

Joining Hotnode

To join Hotnode you go to the Hotnode website and create an account. When you join, you are asked to set your preferences regarding your 'nodes' use. You also get a chance to add email addresses for people you would like to be notified of your new Hotnode account. There are various ways to do this, among them:

A) Upload your email address book to Hotnode and let Hotnode store your aliases. You can then choose who you want to invite to your network. Hotnode will also show you any addresses in your address book for people who are already Hotnode members, and can automatically connect you with them.

B) Type addresses into forms.

C) Click to get a flat text email from Hotnode with a "change of address" notification that you can Forward to your friends.

When you have created your Hotnode account, several default relationships and subscriptions have already been made for you, automatically:
  Public—A group that lets anyone in, including Guests (non-members or non-logged in parties)
  Hotnode—you have a relationship to the Hotnode service that cannot be deleted
  Hotnode Members—a relationship to the set of all Gridpost members
  Hotnode Relationship Invites—a subscription to accept relationship invites from Hotnode members
  Hotnode Messages—a subscription to receive messages from any members
  Hotnode Announcements—a subscription
  Hotnode Calendar—a subscription
  Hotnode Types—a subscription to the ontology (cannot be deleted)
    Hotnode Directory—a subscription to the current directory of channels
    Hotnode Marketplace—a subscription to the marketplace directory
    Hotnode Featured Nodes—a subscription to edited channel
    Hotnode What's Popular—a subscription to feed
    Hotnode What's New—a subscription to feed
    Hotnode Recent Posts—a subscription to feed
  My Relationships—a group
    My Contacts—a wizard helps you form relationships with individuals
    My Groups—a wizard helps you form and/or make relationships for one or more other groups . . .

My Friends—a wizard helps you make this group and invite/connect with your friends My Colleagues—a wizard helps you make group and invite/connect with your friends My Family—a wizard helps you make group and invite/connect with your friends My Team My Religion My Class My School My Department My Community My Neighborhood My Customers My Suppliers My Partners My Services—a wizard helps you make relationships to nodes for services you use Job Boards News Services Financial Services etc. . . .

Using Hotnode

The on-line Hotnode service can enhance your email, even if you use only Outlook or any other email client. You can send, get, view and even create hotnodes via any email client. You can also do it via any web browser, or via Desktop Radar.

You can access your Radar account via:

Web browser

Personal Radar

Email

IM

SMS

Phone

Fax

When a message comes into your Hotnode account, it is archived and then mined by us. It is automatically linked to any relevant hotnodes in your account and new hotnodes may be created based on its content. Furthermore, actions may take place on your behalf via rules in your account, and/or via instructions that are embedded in the body of the email.

All postings have the same requirements: The user needs give a hotnode a type, and optionally specify what other hotnodes it relates to and how, and, finally, who gets to do what with it (including look at, link to, etc.). To post a hotnode from the website, you go to your on-line Hotnode account, you select the type of thing you are writing (memo, notification, alert, etc.), you write the content, you specify who should receive it (or to what website it should go if its a blog or a Wiki), you set the policies/rules of its content, and you post it (this process is typically going to be iterative). We "post-process" your entry to create links automatically or semi-automatically. The policies dictate who can see it, when, and what others can do to it, including deletion, display, linking to, copying, etc.

If you are a blogger, you author blog entries on our site and publish them from there. For this we provide a blogging tool on our site. You can also use Desktop Radar, which probably most people will prefer, because it'll typically be more responsive. If you want to preview the semantic content before it's posted, you can test-post before it is published. A blog entry is itself a hotnode because it gets posted as a whole, all at once, with a unique ID and a timestamp. Inside a blog entry hotnode there are references, in the form of semantic links (also hotnodes), to other hotnodes, which may live inside or outside the Radar Networks portal. (If they live outside—i.e. if people are not running our desktop application or a Hotnode server on the blogging site—it's hard to guarantee that they are current and/or valid.)

Hotnode's syntax interpreter is programmable, so users can customize it. For basic consumers we will provide the simplest syntax interpretation by default, and probably very little of the Wild functionality; basic consumers will just use the basic services: enhanced messages, better handling of attachments, hosted semantic search, social networking and spam blocking, etc. Power users will get full parse functionality and programmability of their Hotnode account.

Spam Blocking

Once your contacts know your hotnode account, you can start filtering out any mail that has not originated with Hotnode. Mail from Hotnode is never spam. Hotnode provides trusted mail.

If a non-member sends unsolicited mail to your Hotnode account we do the following:

1. We make them a member and invite them to join before we deliver the message to you.

2. If they don't join, we don't send the message to you.

3. Once they join, you get a relationship invitation from them in your hotnode inbox, but the relationship has to be approved by you, unless they are already in your email addressbook on Hotnode.

If you use Webmail and cannot change your SMTP, then there are several workarounds—one is that when you reply to any message from a hotnode account the reply-to is that hotnode account, so hotnode can intercept the message. Or you can send the message to your own hotnode but put in the body [to: nova@radarnetworks.com] in which case your hotnode agent will send the message on to me via your hotnode. In the worst case you can simply cc your hotnode account if you want it to get messages. This is only an issue for webmail users though. You could also just use Hotnodes' Webmail service to send messages.

You can also create hotnodes via the Hotnode Web site, or via IM—a conversational interface where you interact with a bot that represents your hotnode. So a user can say, "new person "Nova Spivack" and it can reply, "OK. What is Nova's Street Address?" etc. A user can converse not only with their own bot but bots representing other people they have relationships with.

Sharing

One of the new things about Hotnode is that any user can use their Hotnode account to give their friend or colleague a subscription to something. For example, I send you the hotnode for my contact information. If you accept that hotnode, you will always have my current contact information, as long as I update my copy of it to reflect my contact information correctly. No matter how many of my contacts have my contact information—they all get updates when I change my local copy. Others can set their account to alert them, on the Web and/or via email, whenever the contact information hotnode changes.

We can also use this to share our calendars. I can send you the hotnode for my calendar. If you accept it you then get a subscription to my calendar. Any events on my calendar (hotnodes contained within it), that you are allowed to see, will then show up in your copy of my calendar. You can choose to have email notifications sent to you when things change etc. You can also synch your palm pilot with my calendar to see my calendar events on your palm, or with outlook for example.

I can also share files, contacts, todos, and many other things with you in this manner. We both can see the hotnode for the message, but we may each see different links from it to other messages in our private namespaces.

Listerv

Hotnode provides a listerve facility. Members of a group can use email (or Web interface) to publish information to the group and add hotnodes. Akin to Yahoo Groups, this service lets every member of a group set their preferences for notification: Is every new hotnode individual email, sent automatically to the recipient's email address, do they prefer a daily/weekly digests, or an on-line standard listserv-view? Users can also select to have notification separately from the content itself via email, RSS, SMS, IM, etc.

Regular messages sent to/from members of a group are automatically parsed and mined; any Wiki codes are detected. The messages are turned into hotnodes. Then they are sent onwards as enhanced email messages to group members according to their preferences.

These features make a listserver much more useful—all the interactions taking place in the group are actually creating a collective knowledgebase about everything being discussed.

Policy Management & Security

To authenticate email the owner of a Hotnode account can select from a set of available authentication schemes, including:

Password: The text [password <my password>) must be included in the body of my message for it to be accepted Mailback: After a message is posted, a confirmation email from the server to the poster will have to be sent back to the server to get permission.

PGP: Users can put public key signatures into messages.

The owner of an account can set who is allowed to send them hotnodes and who is not allowed to do so, in order to prevent spam.

When a user sends a hotnode via their Hotnode account, it is made available to the recipient according to the recipient's preferences, which the recipient can set to automatically accept any and all hotnodes from the sender. They can also specify that they have to approve each hotnode before it is accepted into their collection. If the recipients don't have a Hotnode account yet, the system will create one for them and send them an email message inviting them to pick up the hotnode that was sent to them, and to configure their new account. This is thus a viral feature.

Hotnode can help protect information from being forward without authorization; we can inhibit or even prevent unauthorized forwarding of messages, files and hotnodes.

Here's how:

1. I make a message and send it to you.

2. The message contains lots of hotwords and also links to attachments on our server. These all link to our server.

3. I designate that the message is for your eyes only when I make it.

4. When you receive it the links work for you and any of your Hotnode accounts and associated browsers or IP addresses, etc. If you try to forward it to someone else, using Hotnode as your SMTP, we will not let you because it is against the policy of that message.

5. If you forward anyway—via another SMTP host that we do not see—and an unauthorized party receives it and then tries to click any of the links, the links will not work for that recipient (we detect that they are an unauthorized recipient).

6. Additionally, the links can have time-expiration keys in them, and we can use cookies, login challenges, or even IP sniffing, to detect whether they are authorized. So they can't surf the hotwords and they can't download the attachments—only those authorized can.

Furthermore—if the unauthorized recipient clicks on anything—the forwarding party will get notified that they forwarded a message to someone else against its policy. That happens as soon as Hotnode gets the click. Further, the author will get notified that the forwarding party was notified. When you make a document "Eyes Only" we add a footer to it such as "WARNING: This Message is Marked as Confidential and Only for You, by the Sender. Do Not Forward. The Sender Will Be Automatically Notified if This Message is Accessed by Unauthorized Parties."

When sent via our SMTP the locked message can be intercepted and turned into a graphic image that pops up from a link in a new email message that launches an applet hosted on our server—it cannot be saved locally and cannot be forwarded to any unauthorized recipients by any reader. Their only choice would be to use screen-capture to scroll through the message and get all the content and paste it into a new picture that they could send to recipients. While not impossible this would be hard and annoying enough that most people wouldn't do it.

In the case where the recipient does not use us as their SMTP they can still be prevented or at least inhibited from forwarding to unauthorized parties in several ways, including:

include a hidden javascript in the message that reports back to the owner whenever it is forwarded and viewed, and could even pop up a warning to recipient (and/or sender and/or owner) if the message is viewed by an unauthorized party.

all the URLs in the message are keyed to the account of the intended recipient. If anyone else tries to surf one of those URLs, or get the attachment, it will make them login and will report the attempt to the owner of the message. This is another deterrent to unauthorized forwards.

To achieve extremely strict access policies (optional in the premium paid version of our service) we actually don't send the body of the message to recipients as regular email at all—rather, the recipient only receives a hotlink to the body of the message, in a regular email message. They click that link to open the message, which is pulled dynamically from our server. The message appears in a popup or in a Web browser. Again, it is keyed only to them. They would have to cut and paste it into a regular email to forward it on—if they do that it will look like HTML gook (unless they know how to author HTML email which is not easy). If they manage to get past that barrier they could forward the message—they could even strip out all the HTML so that recipients can't click on anything (thereby preventing us from tracing). (Ultimately if something is totally decrypted and scrubbed of links it is in the clear and we can't do anything—that's true for all piracy—but at least we can make it really annoying to do that so usually people won't do it.) For people who use our Webmail or desktop Radar (or Radar Dashboard or Toolbar) we can extend and enforce policies onto desktop. This way we can for example prevent unauthorized forwards.

Even in cases where people manage to scrub a message, we can still hide a watermark in it using "lexical steganography" whereby we introduce some sparsely distributed hard-to-detect additional adjectives, typos, spelling errors, or prepositions or other parts of speech and punctuation, spaces, formatting, and hidden text characters etc. They are put in innocuously after you send it so that the recipient doesn't notice they are there—the email is still perfectly readable. These actually code for your identity key. When any client or server of Hotnode gets a message it looks at the pure text to see if there is any lexically encoded watermark in it. If it sees it, we get notified.

We can also watermark every hotnode message to the sender and to receiver by hiding this cryptographically in the URLs it contains. If a recipient forwards such a message to someone else we can trace who they got their copy from. We simply map a unique message ID into the encrypted URL key such that when any link in the message is clicked on we know what copy the link is being called from—so we know whose copy it is (because links have a key that is unique to the recipient). Therefore we know that when John Doe clicks on any link in that message, that Joe Doe is looking at a particular individual's copy of the message. We don't necessarily know that Joe got it directly from that individual—it could have gone via several intermediaries (and who didn't click on anything and so we can't see them)—but as soon as anyone clicks on any link in the message we can trace it.

We can also prevent message tampering in a similar way. We can use lexical steganography to encode a checksum of the document into the text itself in a manner that cannot easily be noticed by readers. If the document is changed in any way—converted to text-only, sliced and diced, altered, etc.—it won't match the checksum hidden in it. We can see that and alert you. We can store the checksum in the text itself, and/or up on our server.

The only way around these lexical measures would be to retype the document—but even then there is a chance that if you retype it word for word that you are unwittingly inserting a key into it that we can recognize if the message ever goes through our system. These are premium features for extreme security.

Hotnode can make a document available one page at a time: Hotnode intercepts attachments, strips out the first page and sends it to your Dashboard or Desktop Radar. At the bottom of the message there is navigation for "next page" "previous page" and each page number as well as "first page" and "last page" and "attachments" as well as any "bookmarks" that the sender created to selected sections of the document. So for to get the second page one clicks on a link, at which point a Hotnode Webmail reader is called up which gives full access to the whole message with Hotnode navigation and full feature set around (via a desktop Web browser). Only problem is if the recipient is offline when you want to read my message—you would only be able to get page 1. One workaround would be to actually provide the whole message and put our page-navigation tool in it to allow for relative hotlinking to sections of the document (a quicker way to navigate within a long email). But those links would only help the reader, they would not provide any special security features to the sender. Still it could be a nice value added overlay (we are an "email over-lay" service of sorts) onto messages.

Account Agent

If I do not use Hotnode as my proxy and neither do you, I can explicity send you a hotnode via Hotnode, even if you are not yet a Hotnode user. I simply send an email to agent@novaspivack.radarnetworks.com and in the body of the email message I put [to <your regular email address or your radar address or my saved alias for you>] (alternatively, if you are a member, I can just Cc your Hotnode address). The agent will see this and send the hotnode to your Hotnode account and, according to your preferences, will also send you an email notification to your regular email account with a link to the hotnode.

Your account agent can handle commands that you send to it via regular email as well. Commands have a special syntax such as [command <some command> parameters . . . ]. For example, you could say [command search (people with lastname=spivack AND friend-of "Jim")] or just "[*search people with lastname "spivack" and friend-of "Jim"]—the command results come back to you via email as text, and/or with a link to a web view of the results.

You could also do triplestore types of queries, like ["Nova Spivack" friend-of which would return all the hotnodes that are linked as "friend-of Nova Spivack."

Dashboard: Social & Semantic Instant Messaging

After the initial launch of Hotnode we release optional free software for the desktop—enabling anyone to interact with their Hotnode more conveniently than via a browser. As time goes by we add more features to it until it becomes the full Desktop Radar, which seamlessly integrates the desktop into your Hotnode.

The Dashboard is initially your address book. It is a jabber client. It shows you current address and presence of all your contacts. It is a Hotnode client and it shows you how much new mail you have at Hotnode (and at any POPs you have too). Hotnode can push news, alerts, etc. to it via Jabber. Also it has a command line interface on it for searching, and even conversing with your hotnode bot, creating new nodes etc. It has a pulldown or other easy way to choose type of message to send and get the form. It also reads in your local address books and processes them and writes back out to them with Hotnode addresses for everyone in them! Or at least enables you to import a new file into your address book if there is no api for writing to it. It also enables you to profile your self and set your presence easily, and do jabber IM with anyone. You can launch various other apps from it—they are plugins that we and others can make. If you "expand" it from dashboard mode to full-mode you get more of Radar appearing (with additional download to first install the expanded feature set, only if you want it).

Ticker

It should be positioned as identity and presence. There may also be "friendsware" features here—for example the ticker. You can post things to the ticker and other hotnode users can subscribe to your ticker. Every hotnode user is a feed. You can make tickers by subscribing to them. You can post to your ticker and they get things. Also, if you subscribe to Joe's ticker, you get article or picture X that Joe posted. Now it comes onto your ticker and (depending on your prefs for your subscription to Joe) when Joe's posting appears on your ticker it can automatically (or not) be reported to your channel and then appears on the tickers of all subscribers to you. It's social IM for news articles, pictures, music. You could have things come into automatically even like RSS you get etc. Also to manually make a new items on the ticker by clicking on it or an empty space in it and a new posting window pops up—you can drag into it, or just draw or type, or paste into it, and then post. You could also say what type of hotnode it is. Also you can have alerts sent out to people—like "time for our phone meeting," etc.—social and semantic IM.

IMPLEMENTATION DETAILS

Goals

We will make it easily for people to create and link to new nodes for any piece of content in their Web site. We also want to enable users to link from any piece of content to existing nodes in our network. Finally we want them to be able to embed full or partial metadata for nodes directly into their site (in order to effectively host their own nodes to the network on their site). This functionality should be available to all Web site developers, bloggers and Wiki users, as well as email users.

In all cases, they will be referring to our central ontology and taxonomy, using semantic links, and linking to nodes we host. We should ideally be able to discover that they are doing this (either by an embedded javascript that acts as a webbug to ping us, or by an explicit ping or registration they send us, or by brute force datamining of their content to look for our tags, or all of the above—see implementation plans below), and subsequently index the content to provide central search, filtering, and other services.

Our approach is to enable the mixture of manual and automatic markup. Our portal will have a healthy dose of interfaces that enable manual semantic markup. One way to do this is to require a certain amount of up-front manual markup, and then an optional automatic markup. Our automation can also be a function of manual markup: those who put in rich markup will get even more benefit from the automation. That this process will always be iterative because the automatic markup will have to be reviewed by the author before posting.
Notes We provide users with reusable HTML items to use to put topics into their content, or to designate any given string as a particular type of thing, or to put links to "related items," "similar items," "definition of this item," etc. into their content. All of these things link to our service which provides value added features to their website or blog.

To do this we make a big taxonomy of topics. Each one has a special piece of embeddable html on our server that executes a javascript file that is generated on the fly.

We also make an ontology of types. Each type has a special piece of embeddable html on our server that executes a javascript file that is generated on the fly.

When you write an article on your blog and you want to categorize to various topics, you just put the embedded html for those categories into your blog. When the page is rendered it executes the javascript which pings our server and alerts to your content. We then index the content of the page that pinged us and associate it with your domain under the topic domain.

We can do the same thing for types—you can put embedded html around a piece of text to say that it is a "person" for example.

We give you a desktop utility that lets you right-click onto any text in any app and a right-menu pops up and you navigate down to select. It then generates the appropriate html for you and inserts it into your content.

What this does is provides a way to markup content semantically, and for us to discover and mine only content for particular things, and for us to then provide aggregated channels, as well as semantic search on the server end. For end users it gives them a way to get their content marked up and found more efficiently.

We also provide a way for bloggers to put our topics into their site, so that people can navigate their content semantically within site—generate the listings on the fly. We are providing them with a sidebar for semantic filtering and navigation that they can put into their typelist or anywhere else in their blog. When using the system users can filter for only content that has been created by "members" or by "guests" or by "anyone" etc. They could also filter for content created by any particular ID or by members with particular rank or ratings in the system. In fact, they can filter along any semantic dimension that there is information about in the system.

When a user clicks on a topic in your blog, a popup opens from our service that show on one side, the top items from their blog (that we previously indexed) for the topic, and on the other side it shows other blogs and other postings that are relevant to the topic.

Other sidebar services we could provide include classified advertising (an embedded html expression for "this posting is a job request" or "this posting is an apartment for rent offer" etc.) We can also enable users to import their blogs into our format.

People might be able to use our utility to annotate other people's content with semantics and links to nodes in our network. So for example, when reading your blog, I could right click on some string in your content and make a link from it to a node out on the semantic web (a node I created or at least a node that allowed me to link to it). That link would be registered as authored by me, and would connect a certain location in your content to a certain node on the semweb. When viewing your site, people with our utility could see any semantics you put into your content, PLUS if they wanted to they could see other links from/to your content that were added by others as annotations.

There are some concerns with the above approach. For one thing, if the embedded html executes a script every time a page is loaded that would have pros and cons. The pro is that it would enable us to track the activity of every piece of microcontent—enabling us to see what is getting read the most. On the other hand, it might overload us with pings.

When a user "edits" a node, or creates a node, anything they do is marked up with xml tags that are ID'd to their account. Users who are not logged in have read-only access, or could make annotations/changes that will he tagged as ID'd to "guest."
Semantic Navigation Box Provide a "semantic navigation and search" box that people can put in their websites. We "manufacture" you custom HTML on our site to put into your site—after you fill out a form on our site that specifies what topics and layout you want for your search box. So you then cut and paste the html we generate for you into your site's navigation so that it appears on every page. This enables people who visit your site, or read any item of content, to click on the topics you selected from our taxonomy as well as any special types or special filters, and get a view of your site for the selected item—we have previously indexed your site and so when someone clicks on some feature in our search box on your site it calls our index and runs a query and returns a popup or page that contains the results. In fact, we can even let you display the results directly from our API, in your own format if you want (instead of displaying the results on a page we format for you) as an option.
Adding Metadata to Existing Content Hotnode provides a way for bloggers and webmasters and other content providers to add semantics to their content, in a manner that we can index. To do this, instead of embedding the javascript html into web pages, it might just be easier to use special custom, nonstandard html or RDF in your content. Our service knows how to index and recognize that metadata. Hotnode makes it really easy for people to add this metadata to their existing content. The best ways to do this is to provide an OS utility that enables them to get the metadata menu by right clicking on any piece of content in any app on their computer—this will allow them to select the type of metadata they want to make about the thing, and will then insert that metadata at the present insertion point in whatever document they are working on. Another way to do it would be to have a popup or other utility that would enable you to easily author semantic metadata in our format and link things in your content to it. For example, if you were typing in your blog and you typed "Nova Spivack" you could then put metadata around it that would designate that as the name of a person and link it to a node for that person—your nodes would be hosted on our service—so it would be a link from your blog content to a node hosted by us (regardless of who hosts your blog)—there might need to be a way to put your css onto nodes we host for you so they have the same look and feel as your blog.

You could also manually point a link to a particular node or we could actually suggest nodes to link to by looking at nodes you already created and/or nodes in communities and topic areas in our network, and/or nodes your friends created to see if there are any matches.

Anyone who is making content on the net should be able to easily link their content to our ontology and taxonomy. They should be able to select some text in whatever document they are authoring and link it to a node on our system—either an existing node or a new node that they can fill out. We also provide them with navigation that they can then put into their content for providing access to their nodes. Since we make nodes for all their content—for every page and every link they make—we are a better way to navigate and search their sites.

We also allow *other people* to come to your content (while logged in as themselves, not as you) and select some content and link it to nodes in our network. Those links would be stored in their namespace. So then when looking at a site you could see various layers of semantic metadata—the layer put there by the author, as well as layers put there by others.

We could provide a utility, either through our app or maybe even a web browser, that is overlaid on the editing screens of existing blog sites, and people use *our* site to edit their data, but we merely act as a conduit between the user and the site. Then we allow them to embed as much semantic info as they want, and of course provide the proper markup and send it to the site.

There are different ways one might want to add semantics to a page. One way would be to simply markup entities on the page with XML tags for their types, which would either create new Nodes for those entities or link to existing nodes for them somehow. Another way people might want to add semantics would be to enter the full metadata for a hotnode into a web page—for example a full contact record—or to just put in the metadata for particular fields such as <price> etc.

Blog & WIKI Functionality

We can provide a richer syntax than current blogging and wiki services, such as:

[new topic: knowledge management]—creates a new hotnode of type "topic" with title "knowledge managment," and links the hotnode for this email message to the hotnode for that topic with a "related to" link, even if there is already an existing hotnode of type topic with that name. It forces the creation of a new hotnode.

[person Nova Spivack]—creates and/or links to a hotnode of type "person" with first name "Nova" and lastname "Spivack"

[<linkname> <A> <B>]—makes an instance of the link <linkname> between hotnode A and hotnode B; creates hotnodes A and B if necessary.

[Website "Minding the Planet" http://novaspivack.typepad.com [topics "knowledge management" "artificial intelligence" "Metaweb"] [slot Notes "This is a cool site. You should read it"]

We can make this syntax even easier and more natural.

So I can use the Radar on-line service to send myself (and/or to send others) notes from any email program, and these notes will be saved and interpreted into a knowledge network on the appropriate Radar nodes.

When a new hotnode is created via email, depending on my prefs, my bot can send me an email with a link to the hotnode and/or the HTML form for the hotnode, so that I can immediately fill it out. Or I can just wait and fill it out later.

Also, attachments are handled intelligently. A separate hotnode is automatically created for every attachment and the hotnode for the email message is linked to the hotnode for the attachment by a "has attachment" link.

In addition the mining agent can recognize and mine certain types of attachments like vcards, ical, standard documents types, RSS, etc.

Every e-mail that is sent to you by the system should contain a set of links along the bottom of the message for quick reference, including: Help (gets you help) Home Undo (undoes whatever the last command was) etc. . . .

You can also put [ignore . . . some text . . . ] to cause the agent to ignore some text. Ignored text will not be indexed and no hotnodes will be created about or from it.

My Hotnode has a UI that is similar to a weblog—That is I and other visitors to it can navigate and search it, just like a blog or any other type of site. But if a particular user has access privileges they can also create new items on my hotnode, or edit items, etc. Usually the admin/owner is the only one who can create new hotnodes. Unless it is a group hotnode, in which case there might be one admin but many people with authoring and editing permissions. Some people could just author, others could just edit, others could be allowed to author and edit. etc. So there's more policy controls on items than a typical wiki, but it can be as open as a wiki too if the admin allows it.

It's easy to create new wiki nodes—which are essentially new postings. You can do it via the web interface, or via email, or IM, etc.

There are a bunch of default "Views" that you can provide on your Hotnode. Every Hotnode must have at least a homepage for that node that the public sees (unless it's a hidden Hotnode), and must have at least an Admin page that the admin can see.

Other sections that can be optionally added into your hotnode include:

Weblog view (show items posted to "Weblog" by time, and archive anything older than x days, weeks, etc. in archive links—every element of my blog is a chunk that I can add in or take out very easily in my Typepad Control Panel.

Wiki view (navigate items by node tree structure, starting from a root node)

Bliki view (navigate items by node tree structure, where every node is a weblog that lists anything posted to it chronologically)

Sitemap view (I can define the preferred navigational structure of my site and make a map)

Directory—the complete directory navigation system

Authors directory—articles in your node listed by author

By date

By popularity (cumulative number of hits per posting)

By activity (items ranked by volume of hits in last n hours)

By type (ontology types)

By rating (using our rating scale)

By cited URLs directory—branch that lists items by URLs they cite (each URL is a category)

By cited domains

By related people (by names of people occurring in your content)

By related companies

By related places

By referring URL (we look at trackbacks and make a directory of sites that refer to your site, under which we list for each referring site what items on your site they point to)

My writing

My offers

My requests by related products by related services by related events
by related topics
by my friends (the categories are people you name as friends, any articles posted by them or by you to them are listed for each)

Example Usage—Change of Email Address

I am a member of Hotnode. I send a message to Jim's regular email address and Jim is not a Hotnode member yet. On this message I also Cc Kris, who may or may not be a Hotnode member (either case will work).

Jim gets the regular email message I sent him via his regular ISP. He also gets a Hotnode version of the message I sent him; and he gets an Invitation message from my Hotnode account (all of this because Hotnode intercepted my message to him via my SMTP settings). This invitation message says:

To: jim@jbrix.org
From: Nova Spivack <nova@novaspivack.hotnode.com>
Subject: Urgent: My E-Mail Address Has Changed—Please Update Your Address Book Now!

Hi Jim, I've changed my email address to nova@novaspivack.hotnode.com because it enables me to do amazing new things with my email.

Please only use this address from now on when you send me email for any purpose.

Please update your email address book now and don't use my other addresses anymore.

Also, I've created a new Hotnode account for you so you can see what it does, and so we can communicate in a smarter way. There is already information there that I've created for you. Click here to visit your new account and set your preferences!

Once you get your Hotnode account, you also get a free Hotnode address that I can send messages to. This address then forwards what I send you to any address you want, or you can pick up messages in Hotnode's webmail interface.

By the way, this message, and the one you just got a minute ago, were generated by my Hotnode.com account. Hotnode is the future of email. It makes e-mail smarter, easier to search and manage, and more useful. And that's just the beginning! It will change your life. Try it out, it's cool!

1. Move your mouse over nouns in this message—you'll see that some of them are "hot"—you can click them and—surf to your Hotnode account to see the linked related information.

2. Also you can see there are links in this message that are visible too—you can use those to surf to related information as well.

3. Finally, at the end of this message, below, there is your personalized Hotnode menu with shortcuts you can use to quickly access your Hotnode account and interact with me in new ways.

Please remember to change your address for me to my Hotnode.com address from now on. And also, please join my Hotnode network so we can use this together. Click here to try it and join now!

Sincerely,
Nova Spivack

Users can also keep their old email address, in which case Hotnode acts as a forwarding address. People can send to a new address via Hotnode (users want Hotnode to intercept their messages to others even if they are not members of the Hotnode service). If they are members it doesn't matter because Hotnode intercepts their outgoing mail, but if they are not members then it's an issue—unless users choose Hotnode as their primary mail client (web or desktop). In that case we can intercept whatever they send to others (even if they are not members and others do not change their POP account—Hotnode can intercept in software). There is actually a rather complex matrix of different scenarios that we have to cover. If all the users care about is sending outgoing messages and having replies to them come via Hotnode, then nobody has to change addresses because Hotnode can do that transparently.

Mining Your Web Browsing at Hotnode

You can use your Hotnode account as your HTTP proxy. By doing this, your account will save the history of every URL you look at and will make hotnodes for them, and mine them. Later, when you search the Web you can search only the sites you have visited previously, or the whole Web. Mining the sites you look at is a powerful way to teach the system. There would probably be a need for a popup window (html or Java) on your desktop—or just a toolbar in your IE for turning "HTTP mining on/off" so that when you can select whether your browsing gets mined and hotnodes get created in your Hotnode account.

Mining/Browsing P006 CIP

A method is described in which browsing activities and information about the web pages, including their content, is monitored, mined, and turned into rich representations used to create a knowledge networks, wherein interconnections represent semantic relationships between the information collected. This can be done locally on the user's computing device and on a remote server.

When the mining and knowledge network generation is done locally on the user's computing device, a monitoring program is used to capture all Web pages, URLs and other Web material that the user interacts with, as well as the content of the Web pages visited, and in the background, store them separately from the browser that is being used. The URLs and metadata on the content are stored in the system long enough for the system to mine the material content, using an ontology and knowledge base which enables entity detection, entity and free-form text classification, etc. This information is then connected using semantic relationships to similar and related representations which have been created in the past, using semantic relationships. To set preferences in this system, the monitoring program is fed with information about the user (name, address, age, etc.) and preferences, both of which are supplied by the user up-front.

When the mining and knowledge network generation is done remotely, the user designates an on-line service to be an intermediate step in the browsing. This can be done by setting the service as a proxy in the browser, or by using a frame-based interface which puts a separate navigation frame around the visited web pages. When the user navigates the links, the on-line service intercepts the pages navigated and performs operations that result in semantic markup of the navigated pages. An account is created with the online service up-front, where the user provides personal information and sets his/her preferences. To control the various features of the mining mechanism, a pop-up window (html or java) on the desktop, or a toolbar in the browser, allows for turning "Mining on/off" as well as setting other preferences, so that the user can control directly whether their browsing gets mined and semcards get created.

The user's Web-browsing behavior is also captured semantically for each Web page visited, Web site visited, document downloaded, etc. (collectively called "Web interactions"). For example, the precise time a user clicks on a Web page is recorded and the length of time the user views the page is recorded. This information is turned into a viewing pattern (see below) which can then be used to infer similarity between otherwise dissimilar or unrelated web pages. For example, a page with certain content X can be inferred to be more strongly related to a page with certain content Z than would otherwise be expected based strictly on content, however, based on timing of Web interactions. Through analysis of the duration that the pages were viewed for, and the proximity in time within which they were viewed, a stronger relationships may be inferred. This stronger implied or inferred relationship can be used to add to the user's knowledge network.

A viewing graph is defined as a collection of semcard nodes, where each semcard is a node in the graph. Each node contains a collection of timestamps representing, among other things, the time at which it was loaded, the duration for which it was viewed, the duration for which it was in the background in the browser, the time at which it was abandoned, the duration for which it was cached in the browser, etc., along with the page's URL and optionally one or more semantic links to other information, the links specifying that node's relationship to this other information. The other information can be either nodes representing Web pages or other documents represented by semcards.

This allows queries to be mapped onto viewing patterns, or random collections of semcards representing Web pages and Web interactions. For example, a query can be constructed for requesting all semcards which represent Web pages that were viewed in the last two days and relate strongly to a specific topic Z. Another example is a query that requests all semcards which represent documents which are related to any semcards representing Web pages which relate exclusively to topic X.

In additions to queries, a special browsing tool can enable simpler types of queries, embodied as browsing actions, to be expressed, where sequences of filters, correspond to sequences of browsing actions, get sequentially applied to the semcard collection. Such a tool can be a pop-up window, a special toolbar installed in the browser, extensions to the browser's menus, or a plug-in that enhances the browser in similar and other ways.

The user can set preferences to the behavior of the mining. Among the preferences are (a) amount of automation, or how thorough and extensive it should be (with settings e.g. high, medium and low), (b) threshold for certainty of a given semantic relationship for human disambiguation to be requested by the system, and (c) amount of automated disambiguation (e.g. high, medium and low). These three (a, b and c) preference settings are inter-dependent, namely, a constrains b, and b constrains c, such that this relationship always holds: a>b>c. This interdependency can be reflected in the user interface in various ways. One solution is to allow the user to only set one at a time and have the others be modified after a setting for it has been chosen; a better method is to dynamically and automatically change the others as one of them is modified, and show this change visually by movement of slider or other kinds of appropriate widgets.

Another preference setting determines privacy, i.e. whether the browsing, mining, semantic relationships, and other features, are visible to other individuals or groups.

Another preference setting determines whether the automatic linking is only to be done with the user's own semantic information or whether links to information created when should also be created. If the user has set their sharing preferences to e.g. "friends", any browsing done by the user will be related semantically and automatically (or semi-automatically in the case of human dis-ambiguation) to those individuals that the user has designated as "friends". This will then enable the user to see The content of Web pages and sites is turned into semantic information via standard data mining mechanisms and natural language processing, as known in the art. The result is turned into semcards, using an underlying ontology. In addition to containing summaries and detailed semantic markup of the content of Web pages, downloaded documents, Web sites, etc., every semcard contains information about its author, time-related things such as time of creation, modification, addition, and sharing history, etc. It also contains policies pertaining to these features. In addition to this automation, users can manually modify, add and delete information, semantic links, classification, etc. that has been created for them by the system.

RN-P007CIP (Business Method Patent)
1. Business Method for Building a Model of the World Through Analysis of On-line Information Using Wikis, listserv, Web pages, dictionaries, encyclopedias, geographical resources, and related content to build a knowledge network, as a way to bootstrap a semantic model of the world, and get people started using semantic technologies using semcards mined form the Web and constructed by hand to build a model of the world that minors documents, databases, web-pages, people, projects, etc. and their real relationships in the world as an intermediate, uniform representation of this information, semcards afford both automatic and human creation and editing of said information The prior art allows users to add to existing knowledge bases, such as online encyclopedias, for example, Wikipedia.com. At sites such as this, a user can add content about a particular topic to existing public Web pages which then become part of the body of content for that topic. The pages are publicly available at the Wikipedia, or similar Web site, and subsequent users can then continue to add to the body of content.

The present invention is a method allowing a user to add a semantic Web page to a body of content, such as Wikipedia, where the semantic page can have various levels of privacy and sharing. The method also allows the user to manually add a semantic Web page using a user interface to a body of content regardless of the format, type or source of the content.

The method entails mining of content, transforming the content into semcards, and storing the semcards in a knowledge network. This mining, transformation and storing of semcards are done regardless of the type, source, or format of the content. Precisely what is mined can be determined by the semantic ISP. For example, an open directory of a data source can be mined or the entire online data source can be mined, or the source and directory can be mined. The semcards that are the outcome of the mining are stored in a network of semcards, thereby incorporating the semantic attributes of the content into an existing knowledge network.

The invention allows a user to add semantic pages to a body of content that does not have any semantic features. The pages can be set to have various levels of privacy, from completely private to completely public. A user can keep the semantic pages she adds quasi-public/private by setting sharing and security preferences for those pages. This privacy can also be time-dependent; a page can be available to some users at certain times and not others.

The present invention allows a user to utilize this user interface to "manually" add and remove semantic relationships from private web pages. This user interface allows access to all parts of the knowledge network. The knowledge network is accessible both by automated processes and manual manipulation by users.

1. Business Method for Building a Model of the World Through Analysis of On-line Information Using Wikis, listserv, Web pages, dictionaries, encyclopedias, geographical resources, and related content to build a knowledge network, as a way to bootstrap a semantic model of the world, and get people started using semantic technologies using semcards mined form the Web and constructed by hand to build a model of the world that minors documents, databases, web-pages, people, projects, etc. and their real relationships in the world as an intermediate, uniform representation of this information, semcards afford both automatic and human creation and editing of said information The prior art allows users to add to existing knowledge bases such as online encyclopedias. At sites such as this, e.g. Wikipedia.com, a user can add content about a particular topic to existing public Web pages which then become part of the body of content for that topic. The pages are publicly available at the Wikipedia, or similar Web site, and subsequent users can then continue to add to the body of content. This content is not semantic, and thus does not provide semantic search features, automatic processing based on semantics, or other features related to the content being semantically tagged.

The present invention is a method allowing a user to add a semantic Web page to a body of content, such as for example Wikipedia. The method also allows the user to manually add a semantic Web page to a body of content regardless of the format, type or source of the content, through the use of a special user interface.

The invention allows a user, using an ontology, to add semantic pages to a body of content that does not have any pre-existing semantic features. The pages can be set to have various levels of privacy, from completely private to completely public: A user can keep the semantic pages she adds quasi-public/private by setting sharing and security preferences for those pages. Privacy can be set to be time-dependent; a page can be available to some users at certain times and not others.

This user interface allows access to all parts of the knowledge network. Using this user interface to "manually" create, modify and remove semantic relationships from private web pages, the present invention allows a user to create a knowledge network. The knowledge network is accessible both by automated processes and manual manipulation and viewing by users.

The present invention provides a method that can supply users with pre-made semantic content, for immediate benefits of all semantic functionalities. To provide users users with pre-existing semantic markup of on-line material, a semantic service provider will automatically process pre-existing on-line content and turn it into semantically-enhanced content, where all benefits of semantic markup will be available to the user. The method entails mining of content, transforming the content into semcards, and storing the semcards in a knowledge network. This mining, transformation and storing of semcards can be done regardless of the type, source, or format of the content. The semcards that are the outcome of the mining are automatically linked to a network of semcards, thereby incorporating the semantic attributes of the content into an existing knowledge network.

This affords users with all the benefits of a semantic representation of the content. For example, an article published on-line by a on-line publisher is processed by the present method. This will identify and mark the article's various parts, such as author, heading and sub-heading, body text, Web links, pictures, keywords, and other specifics of the article, and produce a semcard for it. A user who happens to find the article on the on-line publisher's website, can use for example the title of the article or the author's name on the semantic service provider's Web site to find the semcard for the article. The semcard will be connected to a knowledge network via multiple semantic links to various other semcards; these links can be followed to find the content of these other semcards. For example, a group of users may have provided their comments on the article; these comments can be viewed by doing a query for all semcards of type "critique" which are linked to the article's semcard by the semantic link "about". Alternatively, the user could have gone directly to the semantic service provider and found the article there.

Precisely what is mined is decided by the semantic service provider. For example, an open directory of a data source can be mined, or the entire online data source can be mined, or the source and directory can be mined. Alternatively, if the on-line publisher collaborates with the semantic service provider. In this case a link to all the semcards for the article could be available directly in the on-line Web page for the article on the publisher's site. In this case the user does not have to use the title or author of the article to find the semcard for it, but can follow those links directly to the semcard for the semantic content provider.

In an alternative setup, the on-line publisher is the semantic service provider. In this case articles do not exist both as standard Web pages and semcards, but rather, all articles are published only as semcards.

The method for mining news, wikipedia content, and other material, is as follows:

1. Profile target to be mined by making models of typical layout, key structural features, predicted content area, etc. to build semi-static profiles that dictate gross features and identify content areas. This step is done mostly manually.

2. Link all concepts in all profiles to ontology, where possible. This step is done manually.

3. Develop analysis rules on to work with profiles. Rules include comparing analyzed content to existing semcards. This step is done manually.

4. Run analysis. This step is automatic. This step can be expanded into two algorithms—see algorithms described for mining free-form text and wiki content.

5. Publish the semcards created from process for human interaction, so that users may edit, change, copy, delete, extend, etc. the semcards and the semantic links created by the process.

By first selecting reasonably well-structured data to be profiled and analyzed, such as Wikipedia.com, a solid foundation of reasonably clean knowledge networks can be built up step by step, each subsequent data source analyzed will benefit from prior semcards created, allowing increasingly less structured data sources to be processed as time progresses.

2. Business Method for Making Email Semantic by Automatic On-line Processing

Attacking the sharp usability curve of learning about semantic concepts by putting semantic features into email in an easy-to-use way The present invention enables automatic semantic mining of content sent by a user. This mining is done without requiring any actions or special editing by the user, such as inserting special characters or identifying terms or phrases as potential semantic objects. In one embodiment, the user has a semantic email account or some type of account with a semantic service provider or semantic ISP. In another embodiment, the user keeps the same normal, non-semantic e-mail account but adjusts mailbox settings so that mail received and sent are processed by the semantic service provider.

Users of the system sign up for an account with the on-line service. The account enables them to set preferences regarding the automatic analysis of their email. The semantic service provider processes their incoming and outgoing e-mail, creating a set of semcards representing the email itself, and concepts referenced in the e-mail. The service provider does this in the user's account by the use of an ontology and natural language processing techniques. In this manner, no intervention is required of the user (other than a few initial set-up steps such as described above, if an existing e-mail account is being used). Using the system the user composes e-mail in the manner she would normally compose an e-mail. However, when the e-mail is sent it is treated as a semantic e-mail. The novel aspect here is that the user does not have compose the e-mail in a different way to have the e-mail semantically processed. When the semcards have been created, they are automatically linked to other previously defined semcards in the user's account, enlarging the user's knowledge network.

Users can list their private and business contacts in their account, either by providing such information by hand or by uploading their address book into the system. Sets of different preference settings can then be associated with separate (named or unnamed) groups of contacts, enabling differential treatment depending on who the user communicates with. For example, a group called "friends" may have certain settings for how entries from/to them should be formatted for viewing. The system processes the addressees of all emails to infer who is communicating with the user about what, and vice versa, as well as inferring with whom the user has relationships, what kind of relationships those are, and what projects they relate to. Emails are then linked to those inferred projects. The user can later correct any mistakes that the system may have made in such inferencing.

In another embodiment, the user can instruct directly that certain words or phrases in an e-mail be transformed into semcards. The level or frequency that the user explicitly demarcates which words in an e-mail should be mined semantically can be used to determine the level of mining that the ISP needs to do for e-mail sent by that user. This level of processing is a preference set in the user's account with the semantic service provider.

For example, the user can set a preference for minimal, medium, or heavy mining of her e-mail by the semantic ISP. If the user prefers to inserts a large number of semantic markups in the e-mail, minimal mining may be appropriate to reduce processing by the ISP. The preference may be appropriate for more sophisticated users or users already with semantic capabilities. Similarly, if the user does no marking, such as in the embodiment described above, she may set a preference for heavy mining so that the ISP will maximize mining of the e-mail, thereby doing most of the semantic "heavy lifting."

Another important novel aspect of the present invention is that the semantic service provider uses an ontology to create semcards from the content of the e-mail. The ontology is used to connect or relate concepts identified in the email, either automatically or via the user-specified markup, to an existing knowledge network. When the user does not insert any markups and the service provider automatically creates the semcards, the ontology is used by the service provider to detect references to known concepts in the email, make further inferences about relationships between these concepts, and link them into a knowledge network. The knowledge network can be based on information from just the user, from the user and those with which she has relationships, from anonymous yet relevant users, or from the whole world.

Automatic creation of semantic social networks is done by collecting email addresses from the user's emails. These emails are then matched against users in the system, to find matches. When an email address employed by the user is found to be that of another user in the system (i.e. a user who has an account with the service provider), semantic links are created between the semcard representing those two users. Each link created is of a separate type. Depending on other factors, including the content of the emails exchanged, and the number of emails exchanged, these types include types such as "friend", "colleague", "relative", "conversants", with the last type being the most generic. To take the example of the "conversants" link type: The link is created between the user and another person when they have exchanged at least two emails, where the second email was a response to the first. The link represents the time of the exchange (time of sending, time of reading, both emails), as well as who made the link, and when. In the case of automation, the unique identifier of the automatic process is used as the author of the link.

Algorithms

1. Run email through a spell checker—fix any potential spelling errors. Give score for each spelling correction based on certainty.

2. Run email through a grammar checker—identify places with potentially missing referents.

3. Infer/propose referents for where there are potentially missing referents. Give score for certainty of each proposed referent.

4. Compare words and phrases against known words and phrases, stored in a dictionary, to identify entities and concepts.

5. Relate identified words and phrases from last step to an ontology; score all such relations with a certainty value.

6. If necessary, redo steps 1 through 5 based on information produced so far.

For example, similarities between a phrase in the email and a phrase in the dictionary can help correct spelling mistakes not caught first time around.

7. Run rule patterns from a rule-book on the email, to detect patterns indicative that certain concepts, as stored in the ontology, are possibly being referenced.

8. Give all detected patterns from last step a certainty value.

9. If necessary, iterate by going back to 3, redoing any steps necessary, based on information produced so far.

For example, concepts revealed by rule pattern analysis could result in new inferred referents.

10. Give all patterns from last step a certainty score depending on how many of the preceding steps support them, as well as how well they fit with other patterns detected.

11. Remove all patterns from last step with a score that falls below a certain threshold.

12. Create semcards for all concepts that remain; create semantic links between the new semcards and old semcards according to the user's preferences or default settings; link new semcards to places in the email where they are mentioned and/or to the menu created in the next step.

13. Create semantic menu and put into the email.

Semantic menu allows information access to semcards related to several dimensions found to be important to the email, as well as according to the user's preferences. For example, a menu could allow access to related emails along semantic dimensions chosen, such as time, topic, type of attachment, etc.

Step Details

Comparison, step 4: Three-part comparison: Boolean comparison, returns TRUE if words match with a large dictionary; key-word matching to words and phrases that have designated roles, meanings, etc., to a certain domain; and comparison to semcards created for and by this user earlier.

Certainty value, step 5: Computed based on relatively simple word- and phrase-matching to ontological concepts, and semcards created for and by this user earlier.

If necessary, step 6: Using a measure of cohesiveness at the grammatical and semantic levels, along with_a set threshold, tuned using corpora of emails.

Certainty value, step 8: Computed based on estimated distance from concepts in ontology. The larger the distance, the lower the value.

If necessary, step 9: If a certain threshold for the average of all certainty values in step 8 is not reached. Threshold is tuned in the system over time.

Certainty score, step 10: Computed using a summarization algorithm that combines scores from each step.

Threshold, step 11: Tuned using corpora of emails.

0. Receive Email
1. Detection
  1.1. PRE-PROCESSING: Check spelling, grammar, 'tokenizing', etc., of ema 1.2. DETECT: Detect new concepts using existing semcards, rule patterns, 1.3. SKETCH: Create new preliminary semcards from new concepts.
2. Matching
  2.1. Are there any existing semcards, created or modified automatically created or modified manually by user, that can help further analyze the or disambiguate between conflicting preliminary semcards, or help detect go to step 3. Otherwise go to next step.
  2.2. Are there any existing semcards, created automatically for users wi or has had, a relationship, or were created manually by said users, that analyze the preliminary semcards, or disambiguate between conflicting pr help detect new concepts? If yes, go to step 3. Otherwise go to next step 2.3. Are there any existing semcards, modified by users with which the u relationship, that can help further analyze the preliminary semcards, or conflicting preliminary semcards, or help detect new concepts? If yes, g go to next step.
  2.4. Are there any existing semcards, created by other users, that can h preliminary semcards, or disambiguate between conflicting preliminary se new concepts? If yes, go to step 3. Otherwise go to next step.
  2.5. Are there any existing semcards, modified by other users, that can the preliminary semcards, or disambiguate between conflicting preliminary detect new concepts? If yes, go to step 3. Otherwise go to Step 3.3.
3. Solidification
  3.1. SELECT. Use existing semcards identified in Step 2 to direct which "solidified".
  3.2. LINK. Use existing semcards identified in Step 2 to direct the crea new solidified semcards and existing semcards.
  3.4. FINALIZE. Have enough semcards and semantic links been created for to Step 4. If not, go to next step.
  3.3. Have all sub-steps in Step 2 been tried? If not, go to Step 2. Other
4. TERMINATION: Discard all non-solidified semcards and terminate process 3. Method for Semantic Markup in Free-form Text for Providing Access to Knowledge Networks CIP to the SEMCARD app
  syntax that enables markup of text, giving instructions for post-processing of the material, including making links to semcards and creating new semcards
  syntax, scoping, connection to semantics, preferences Problem Users of Email, Wikis and listservs are currently not able to access semantic services such as those described by the semcard technology. This results in impoverished functionality, where the lack of rich interconnections between information prevents efficient classification, storage and retrieval of information. Even for those using simple email clients, Listserv or Wiki technologies, a system which allowed access to semantically enriched information via such primitive tools could improve productivity and result in more efficient use of information.

Solution

We describe an on-line service that can enhance email, Wiki, blog and listerv entries with semantic functionality in two main ways, by applying a special free-form text analysis processing system. First, by automatically analyzing emails sent via the on-line service, and second, by allowing syntactic markup in the free-form text of the email. With syntactic markup, the system can do a better job of analyzing the free-form text. With syntactic markup, users can send, get, view and even create semantically enhanced messages via any email client, and any Wiki and blog composing tools; it can also be done via any web browser.

For the sake of brevity, the term "entries", in the remainder of this discussion, should be read in the most general sense as referring to free-form text intended for various purposes, including email messages, Wild pages, blog postings and Listserv entries.

Users of the system sign up for an account with the on-line service. The account enables them to set preferences regarding the automatic analysis of entries and markup syntax. Users can also list their private and business contacts, either by providing such information by hand or by uploading their address book into the system. Sets of different preference settings can then be associated with separate (named or unnamed) groups of contacts, enabling differential treatment depending on who the user communicates with. For example, a group called "friends" may have certain settings for how entries from/to them should be formatted for viewing.

When an entry is posted, the system turns it into a semcard, with information about the poster's identity, display preferences, and automation rules, derived from the user's account information, where this data is stored. The content of the message is then analyzed. If it contains no special markup the system will try to automatically recognize terms, concepts, entities mentioned, etc. in the entry, and relate these with semantic links to other semcards related to these.

This automatic analysis is done according to the instructions set in the user's preference settings. If the entry contains syntactic markup, it is analyzed according to the rules of the syntax, and semantic links and semcards are created based on the specifications found in the markup.

When the system sees markup, such as for example [knowledge management], it will link to a semcard named "knowledge management" (referencing a particular node in an ontology representing the concept of knowledge management) from the appropriate location in the body text of the semcard for that email message. If no such semcard exists, it will create one automatically. To take another example, a user can type [person: Nova Spivack] and Hotnode will make a new person semcard, or link to an existing person semcard describing a person with that name.

Users can also interact with the system by sending emails with questions, [? friend-of Nova Spivack] for example. The system will reply with a message containing the query results from the user's account—in this example with a list of all semcards of type person who satisfy the constraint to be listed as "friend-of" Nova Spivack. To do this, the system creates a special "results" semcard that organizes the results of the query for the user (again, according to their preferences as set in the account). This results semcard is semantically related to the entry which contains the instructions for doing the query, in the form of a "resulted-from" semantic link.

Conversational interaction with the system can be conducted in real-time via instant messaging. In this case the system responds like a "bot", or automatic conversant, and may be enhanced with the ability to parse free-form natural language.

Users can control the visibility of their semcards created from entries. Semantically enhanced entries can be visible only to the person who authored it (posted to self only), visible to a few selected recipients (posted to a few selected recipients), visible to members of a list (posted to an email list or listserv), or visible to all. This can be achieved in various ways, for example, by posting it to public listerv or cc-ing the posting to a public email address at the on-line service.

For example, typing [begin-sharing:public] Nova Spivack [end-sharing] in a free-form email will make the semcard for the concept represented by the word "Nova Spivack" publically viewable by anyone who receives the email, by following a link put into the email by the semantic processing system.

When a user posts a message, the resulting semcards are shared with the recipients of the message (via their accounts). Because the on-line service intercepts entries to/from every user, and turns it into a semcard, it can create a superb search index for each user of their own material. This index is hosted at the on-line service; it is only accessible by the user to which the information belongs. With such indexing, users can create various default views, as well as custom views, on their own data, through semantic search and filtering.

[new topic: knowledge management]—creates a new hotnode of type "topic" with title "knowledge managment," and links the hotnode for this email message to the hotnode for that topic with a "related to" link, even if there is already an existing hotnode of type topic with that name. It forces the creation of a new hotnode.

Examples of Markup Syntax

[begin blogentry "Minding the Planet"] HELLO [end blogentry]—tells the system that the content between the two 'entry' markers ("HELLO") should become an entry in the blog named "Minding the Planet". If the second 'entry' marker is omitted, anything in the entry following the first marker will be included as content.

[person Nova Spivack]—creates and/or links to a hotnode of type "person" with first name "Nova" and lastname "Spivack"

[<linkname> <A> <B>]—makes an instance of the link <linkname> between semcard <A> and semcard <B>; creates semcards A and B if necessary.

[begin comment-on] [blog "Minding the Planet"] This is a cool blog! [end comment-on]—tells the system to link the comment to the blog with a link of type comment-on.

[blog "Minding the Planet" http://novaspivack.typepad.com [topics "knowledge management" "artificial intelligence" "Metaweb"] [slot Notes "This is a cool site. You should read it"]

[begin ignore] . . . some text . . . [end ignore]—causes the system to ignore some text. Ignored text will not be indexed and no semcards will be created about or from it.

Email

When a new semcard is created via email, an automated program ("bot") can be set (via account preferences) to send the user an email with a link to the semcard, and/or the HTML form for the semcard, so that they can immediately—or later—fill it out further with more data.

Attachments are handled intelligently. A separate semcard is automatically created for every attachment and the semcard for the email message is linked to the semcard for the attachment by a "has-attachment" link.

The system can recognize, analyze and process various types of attachments like vcards, ical, standard documents types, RSS, etc.

Every e-mail that is sent to a user via the system contains a set of semantic links along the bottom of the message for quick reference, search, and other activities including: Help (gets you help), Home (brings you to your account with the on-line service), Undo (undoes whatever the last command was).

My Hotnode has a UT that is similar to a weblog—That is I and other visitors to it can navigate and search it, just like a blog or any other type of site. But if a particular user has access privileges they can also create new items on my hotnode, or edit items, etc. Usually the admin/owner is the only one who can create new hotnodes. Unless it is a group hotnode, in which case there might be one admin but many people with authoring and editing permissions. Some people could just author, others could just edit, others could be allowed to author and edit. etc. So there's more policy controls on items than a typical wiki, but it can be as open as a wiki too if the admin allows it.

It's easy to create new wiki nodes—which are essentially new postings. You can do it via the web interface, or via email, or IM, etc.

There are a bunch of default "Views" that you can provide on your Hotnode. Every Hotnode must have at least a homepage for that node that the public sees (unless it's a hidden Hotnode), and must have at least an Admin page that the admin can see.

Other sections that can be optionally added into your hotnode include:

Weblog view (show items posted to "Weblog" by time, and archive anything older than x days, weeks, etc. in archive links—see my blog for examples www.novaspivack.typepad.com). Basically in Typepad, every element of my blog is a chunk that I can add in or take out very easily in my Typepad Control Panel.

Wiki view (navigate items by node tree structure, starting from a root node)

Bliki view (navigate items by node tree structure, where every node is a weblog that lists anything posted to it chronologically)

Sitemap view (I can define the preferred navigational structure of my site and make a map)

Directory—the complete directory navigation system

Authors directory—articles in your node listed by author

By date

By popularity (cumulative number of hits per posting)

By activity (items ranked by volume of hits in last n hours)

By type (ontology types)

By rating (using our rating scale)

By cited URLs directory—branch that lists items by URLs they cite (each URL is a category)

By cited domains

By related people (by names of people occurring in your content)

By related companies

By related places

By referring URL (we look at trackbacks and make a directory of sites that refer to your site, under which we list for each referring site what items on your site they point to)

My writing

My offers

My requests by related products
by related services
by related events
by related topics
by my friends (the categories are people you name as friends, any articles posted by them or by you to them are listed for each)

Display and Slot Mechanisms of Semcards

A semcard can have sharing policies associated with every one of its slot, making the viewing of a single semcard different for people with different access privileges to that semcard. In other words, if $$S1[SL1:RU\text{-}SH1]$$

represents sharing rules RU-SH1 for slot SL1 on semcard S1, then RU-SH1 can hold information that restricts access (i.e. viewing, modifying, copying, forwarding, etc.) of a non-allowed party to the particular content of SL1, or completely to the existence of the slot itself inclusive its content.

The semcard display rules can display content from semcards other than the one they belong to. They do this by referencing the slots in other semcards, and specifying how the content of those slots should be displayed in the context of the semcard that they belong to. In other words, if $$S1[D1:R1]$$

represents semcard S1 containing display rules D1, and display rules D1 containing reference R1, and further, if $$S2.SL1:C1]$$

represents slot SL1 on semcard S2 with content C1, we let $$R1 \rightarrow S2[SL1:C1]$$

stand for the fact that that reference R1 is a reference to content C1 in slot SL1 in semcard S2, and D1 holding the display instructions for how this slot should be displayed in the context of semcard S1. The full expression is $$S1[D1:R1 \rightarrow S2[SL1:C1]],$$

which reads "semcard S1 has a reference R1 which references content C1 of slot SL1 on semcard S2 according to display rules D1".

The mechanism effectively turns every semcard into a kind of "microportal". every hotnode=gomeme=microportal about something=semantic wiki node
every hotnode has a URI permalink
every hotnode has a UI
the UI can include any slots from the type for the hotnode
the UI can include any other items in the system (other hotnodes, or slots from hotnodes), inline
the UI can include all sorts of widgets too (chat room, discussion, whiteboard, game, vote, list, shopping cart, guestlist, comments, photo album, buttons, sliders, meters, charts, media streams, etc.)
the UI can include art and text etc. in HTML for example
Widgets in the UI can include rules—so when you click on a button something in particular can happen
Agents can be attached to a hotnode to do things—like keep it up to date, send alerts, etc.
Every hotnode has policies on it governing who can see it, who can change policies, who can add to or edit content in it, etc.
Every hotnode can be subscribed to as RSS or Atom or email digest or IM alerts, etc.
Every hotnode can be published to (via API, via IM, or via email to an address for that hotnode)
a hotnode can link to other hotnodes via semantic links to express relationships between hotnodes
body text in a hotnode can link to resources with URLs (any file, web page, or even another hotnode) via standard hotlinks
hotnodes can carry "attachments" (these are data that can be uploaded to, or downloaded from, the hotnode—that may or may not travel with the hotnode)
Fields in hotnodes recognize wiki codes and generate new hotnodes or link to existing hotnodes from them
Our system has mining agents that mine various types of content and make/update hotnodes from them—mining the web, mining email, mining IM, mining local files, mining wikipedia, mining various other content sites—anyone can make one of these agents for their particular content, and it will mine it make hotnodes in their nodespace on hotnode.com
via our formats and API external services can also use scripts to create and post hotnodes to us from their apps
we provide authoring tools (via Web and desktop) for end-users to manually create hotnodes
we provide tools for end-users to search, surf, etc. our network
we give everyone an account on our system—which gives them their own nodespace where they can author and aggregate hotnodes
we also give accounts to groups/communities and online services that wish to have nodespaces
an interesting use of this system is that we make a microportal for every "thing" on the net—every site, person, place, event, company, product, service, topic, etc. These things can be interacted with like little portals—people can post to them, link to them, link from them, register with them, subscribe to them, and track an interest via them, meet via them, etc.

Miscellaneous Notes

We make an IE toolbar plug-in (the radar toolbar we have already) that is designed to replace BOTH the browser's regular address bar (for typing in URLs) and things like the Google toolbar etc.

Basically, if you type a URL into it, it will launch your browser to that URL (and send the URL to your hotnode account to be stored there!). But if you type a query or command it will get executed. So the toolbar is an intelligent command line. It should be 2 lines wide so that it can ask you a question in there and you can reploy, and it scrolls up down so you can see the history.

So you can . . .
use it to control your IE browser (launch URLs), instead of using the default address bar in IE
use it to search the web (via Hotnode)
use it to ask hotnode questions
use it to send/receive IM's/from your friends
use it to enter commands to Hotnode (like make a new hotnode for "Joe Smith", or remind me of x in 2 days, etc.)
use it to see what's related to whatever the browser is currently focused on ("? Related people")
use it to command local apps to do things ("new email" launches a new email msg form in your local email app, or your webmail)
set your online status ("my status=busy")
teach your hotnode things ("john smith is my friend")
get alerts from your hotnode agents ("nova it's time for your meeting"—hotnode can even send commands to your toolbar, causing your browser to open pages, including pages it generates on the fly for you—for example your Hotnode can alert you that a meeting is about to start and take you to the page for the Hotnode about that meeting) And we should make it extensible so that other's can add to it's functionality!

We can totally embrace and extend the browser . . .

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

The invention claimed is:

1. A method of managing a set of interrelated knowledge objects, the method comprising:

receiving a user request to create a knowledge object of one of a plurality of object types that is associated with a predetermined semantic structure suitable to represent the knowledge object;

filling out a template specific to the object type having a plurality of predetermined fields based on instructions from the user;

creating the knowledge object of the object type in a web namespace based on the filled-out template;

analyzing the knowledge object to identify metadata associated with the knowledge object;

creating a semantic link between the knowledge object and another knowledge object of the set of interrelated knowledge objects, based on the identified metadata; and managing a subscription by a second user to knowledge objects in the web namespace subject to on a plurality of rules specifying how the knowledge objects are filtered before delivery to the second user, how often the knowledge objects are delivered, and how the knowledge objects are routed to the second user, wherein at least one of the steps is performed by a computer.

2. The method of claim 1, further comprising, tracking a set of rules governing permission to access the set of interrelated knowledge objects.

3. The method of claim 2, wherein, the set of rules are specifiable by an administrative user of the set of interrelated knowledge objects.

4. The method of claim 1, wherein, the user is one or more of, the administrative user, or another using having access rights in the web namespace.

5. The method of claim 1, wherein the template is user-modifiable to add a field to or remove a field from the plurality of predetermined fields.

6. The method of claim 1, wherein, the knowledge object is associated with a knowledge database.

7. The method of claim 6, wherein, the knowledge database is an ontology or taxonomy.

8. The method of claim 1, wherein, the plurality of object types includes a person, a project, a document, a question, and a topic.

9. A method, comprising:

receiving a request to create a customized web namespace from an administrator;

identifying user preferences specified by the administrator comprising permissions governing access rights by a visitor of the customized web namespace;

wherein the visitor is exclusive of the administrator;

enforcing the governing access rights of the customized web namespace by the visitor;

receiving a request from the administrator to add content to the customized web namespace;

filling out a template of a particular semantic structure based on an identified type of the content to be added;

adding the content to the customized web namespace based on the filled-out template;

associating the content with a knowledge data structure;

receiving an access request from the visitor to interact with the customized web namespace, wherein the access request comprises one or more request for, viewing, writing, or editing one or more of the plurality of knowledge objects in the web namespace;

determining the permissions governing access or edit rights possessed by the visitor; and in response to determining that the visitor possesses the permissions to satisfy the access request received from the visitor, enabling the visitor to interact with the web namespace, wherein visibility or edit ability or the content to the visitor is determined by at least one privacy setting in the user preferences, and wherein at least one of the steps is performed by a computer.

10. The method of claim 9, wherein, the template is user-specifiable or user-modifiable by selecting to show, hide, add, delete, or reordering slots in the template.

11. The method of claim 9, wherein, a particular semantic structure is associated with a content type for representing, a person, a project, a document, a question, or a topic.

12. The method of claim 9, further comprising, granting default access and edit permissions of a web-object in the customized web namespace to the administrator.

13. The method of claim 9, further comprising, managing a subscription to the content for the subscriber user based on the set of rules.

14. The method of claim 9, wherein, the visitor interacts with the customized web namespace via one or more of a web browser, an email client, and an Rich Site Summary (RSS) client.

15. The method of claim 9, wherein, the visitor interacts with the customized web namespace via one or more of Extensive Markup Language-Remote Procedure Call (XML-RPC) and Simple Object Access Protocol (SOAP) clients.

16. The method of claim 9, wherein, the customized web namespace is semantic-search enabled.

17. A system for managing a set of interrelated knowledge objects, the system comprising:

a processor and memory, cooperating to function as:

means for a receiving unit configured to receive a user request to create a knowledge object of one of a plurality of object types that is associated with a predetermined semantic structure suitable to represent the knowledge object;

means for a filling unit configured to fill out a template specific to the object type having a plurality of predetermined fields based on instructions from the user;

means for a creating unit configured to create the knowledge object of the object type in a web namespace based on the filled-out template;

means for an analyzing unit configured to analyze the knowledge object to identify metadata associated with the knowledge object;

means for a second creating unit configured to create a semantic link between the knowledge object and another knowledge object of the set of interrelated knowledge objects, based on the identified metadata; and means for managing a subscription by a second user to knowledge objects in the web namespace subject to on a plurality of rules specifying how the knowledge objects are filtered before delivery to the second user, how often the knowledge objects are delivered, and the knowledge objects are routed to the second user.

\* \* \* \* \*